US012782250B2

(12) United States Patent
Efremov et al.

(10) Patent No.: US 12,782,250 B2
(45) Date of Patent: Nov. 3, 2026

(54) MEANS AND METHODS FOR TIME-RESOLVED SAMPLING

(71) Applicants: VIB VZW, Ghent (BE); VRIJE UNIVERSITEIT BRUSSEL, Brussels (BE)

(72) Inventors: Rouslan Efremov, Ghent (BE); Stefania Torino, Brussels (BE); Raf Claessens, Neerijse (BE)

(73) Assignees: Vrije Universiteit Brussel, Brussels (BE); VIB VZW, Ghent (BE)

( * ) Notice: Subject to any disclaimer, the term of this patent is extended or adjusted under 35 U.S.C. 154(b) by 635 days.

(21) Appl. No.: 18/260,873

(22) PCT Filed: Jan. 10, 2022

(86) PCT No.: PCT/EP2022/050330

§ 371 (c)(1),
(2) Date: Jul. 10, 2023

(87) PCT Pub. No.: WO2022/148859

PCT Pub. Date: Jul. 14, 2022

(65) Prior Publication Data

US 2024/0085288 A1 Mar. 14, 2024

(30) Foreign Application Priority Data

Jan. 11, 2021 (EP) .................................... 21150874

(51) Int. Cl.
*G01N 1/42* (2006.01)
*G01N 1/28* (2006.01)

(52) U.S. Cl.
CPC ............ *G01N 1/42* (2013.01); *G01N 1/2813* (2013.01)

(58) Field of Classification Search
None
See application file for complete search history.

(56) References Cited

U.S. PATENT DOCUMENTS

2013/0260452 A1* 10/2013 Toner .................... A01N 1/147 435/307.1
2019/0328662 A1* 10/2019 Chilkoti ................ A61K 47/42

FOREIGN PATENT DOCUMENTS

GB 2474228 A * 4/2011 ........ B01L 3/502753

OTHER PUBLICATIONS

Chen, Bo, et al. "Structural Dynamics of Ribosome Subunit Association Studied by Mixing-Spraying Time-Resolved Cryogenic Electron Microscopy." Structure (London), vol. 23, No. 6, 2015, pp. 1097-1105.

(Continued)

*Primary Examiner* — Jennifer Wecker
*Assistant Examiner* — Tracy Ching-Tian Colena
(74) *Attorney, Agent, or Firm* — Patent Law Works LLP

(57) ABSTRACT

The present invention relates to the field of time-resolved protein sampling, more specifically for use in structural biology, even more specifically for structural analysis of proteins by Cryogenic-electron microscopy (Cryo-EM). The invention provides for methods and devices for preparing vitrified samples for transmission electron microscopy at millisecond time-resolution using a microfluidics-based integrated device. More specifically, the sampling means and methods combine fast mixing with a tunable droplet-on-demand generation to control droplet formation, spraying and sampling velocity, resulting in a sampling method requiring very limited protein amounts.

24 Claims, 18 Drawing Sheets

(56) References Cited

OTHER PUBLICATIONS

PCT International Search Report and Written Opinion; Application No. PCT/EP2022/050330 VIB VZW, International filing date of Jan. 10, 2022, date of mailing Jun. 15, 2022, 15 pages.

* cited by examiner

FIG. 10A
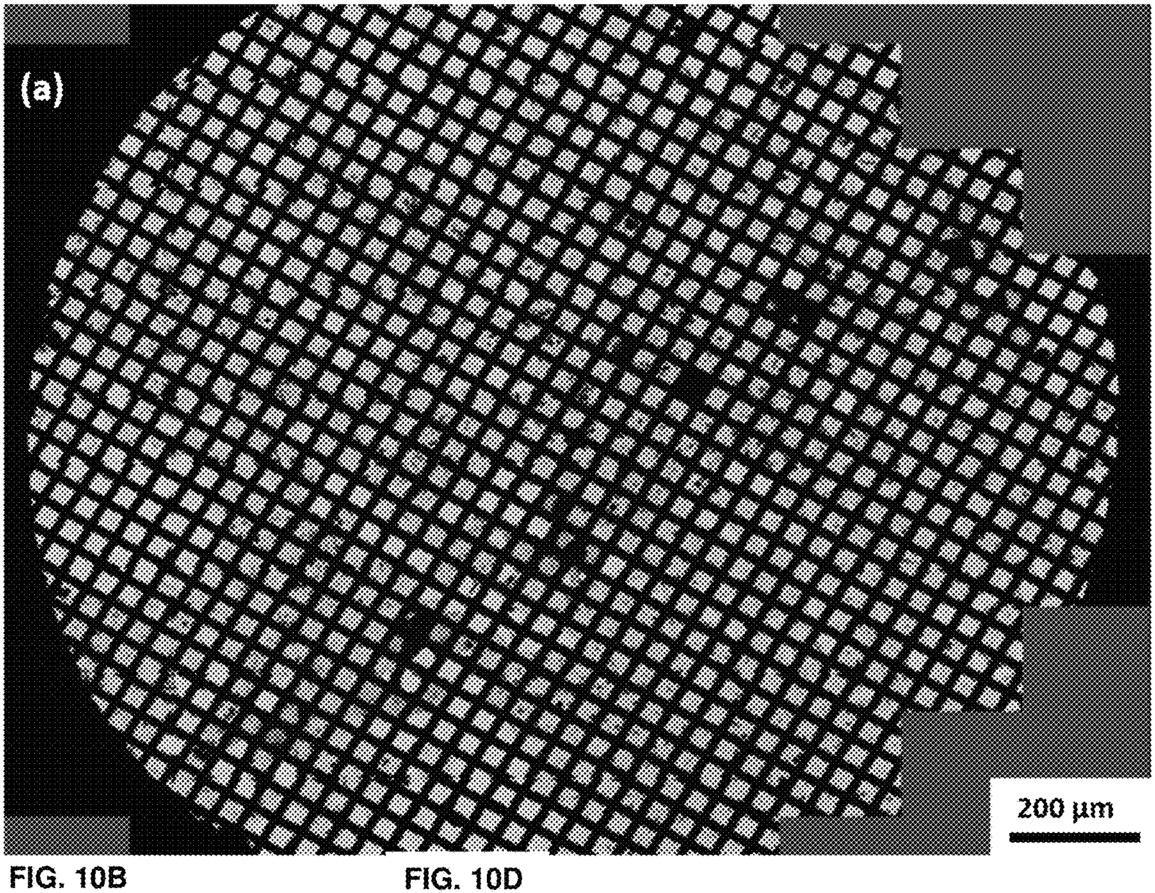
FIG. 10B
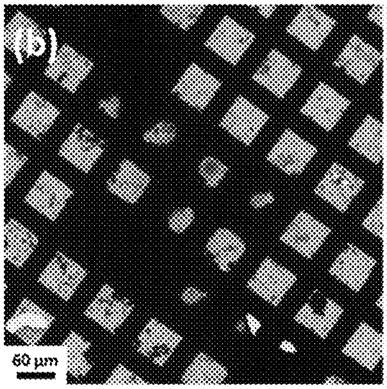
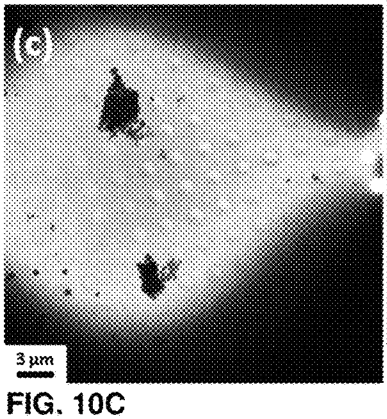
FIG. 10C
FIG. 10D
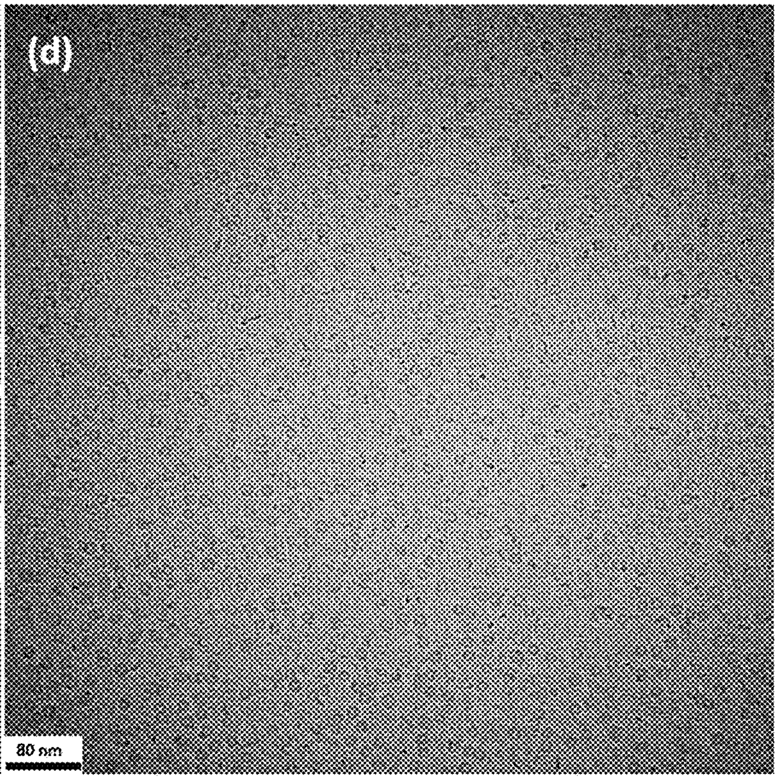

MEANS AND METHODS FOR TIME-RESOLVED SAMPLING

CROSS-REFERENCE TO RELATED APPLICATIONS

This application is a national phase entry under 35 U.S.C. § 371 of International Patent Application PCT/EP2022/050330, filed Jan. 10, 2022, designating the United States of America and published in English as International Patent Publication WO 2022/148859 on Jul. 14, 2022, which claims the benefit under Article 8 of the Patent Cooperation Treaty to European Patent Application Serial No. 21150874.2, filed Jan. 11, 2021, the entireties of which are hereby incorporated by reference.

FIELD OF THE INVENTION

The present invention relates to the field of time-resolved protein sampling, more specifically for use in structural biology, even more specifically for structural analysis of proteins by Cryogenic-electron microscopy (Cryo-EM). The invention provides for methods and devices for preparing vitrified samples for transmission electron microscopy at millisecond time-resolution using a microfluidics-based integrated device. More specifically, the sampling means and methods combine fast mixing with a tunable droplet-on-demand generation to control droplet formation, spraying and sampling velocity, resulting in a sampling method requiring very limited protein amounts.

BACKGROUND

Time-resolved Cryogenic-electron microscopy (tr-Cryo-EM) is a structural biology method which in principle allows high-resolution structural analysis of intermediates of biological reactions and other non-stationary processes occurring in soft matter or some nanomaterials. Time-resolved cryo-EM in fact combines the visualization of the molecular structure at single-particle level with the ability to dissect the time progress of a reaction between molecules, and/or of a molecule in different conformational states during a biological reaction. However, since most reactions occur in very short millisecond time-scales, the sampling methods and means to prepare a cryo-EM sample grid require more sophistication and automation. Current attempts have shown that miniaturization of mixers and bioreactors allow to rapidly initiate and synchronize biochemical reactions, followed by spreading the mixtures onto a cryo-EM grid without the need for manual operation or blotting, which ultimately results in a faster sampling time than the lifetime of the structures of interest. Though there is still a need for improving automated and customized sampling on an EM-grid within milliseconds in mild and native protein conditions.

In tr-Cryo-EM sampling, the reaction or biological process is initiated by rapid mixing of a protein solution with a solution of another protein or activating molecule. Alternatively, the reaction can be initiated by a flash of light if photo-sensitive molecules are used, like caged molecules for example. Next, the mixture in which reaction has been initiated, is applied on a cryo-EM grid and the cryo-EM sample is prepared by rapid plunge freezing of the grid in cryogen (usually liquid ethane) after a specified reaction delay time. Plunge freezing arrests the reaction within characteristic times in the range of hundreds of microseconds (Dubochet et al., 1988). The cryo-EM samples are imaged in transmission cryogenic electron microscope followed by image analysis and 3D reconstructions of the structures of proteins frozen in vitreous ice. In this way the structural information about conformations of the intermediates of the biological process can be obtained (Chen et al., 2015; Chen and Frank, 2015; Frank, 2017) and the reaction trajectories thermodynamics and mechanisms can be derived from these structural data.

To prepare cryo-EM grids using time-resolved cryo-EM, protein solutions are sprayed on the cryo-EM grid as micrometer-sized droplets some of which rapidly spread on the surface of plasma-cleaned EM grids creating thin areas of buffer which is vitrified upon cryo-plunging, resulting in areas suitable for cryo-EM imaging (Berriman and Unwin, 1994; Feng et al., 2017). This method of sample application is different from the more common application by pipetting microliter volumes of the sample on EM grid followed by blotting with filter paper. The preparation of sample by spraying small droplets is the only method existing so far which is compatible with high (millisecond) time-resolution required to trap the intermediates of a biological process. The currently applied approaches of droplet generation for time-resolved cryo-EM are based on atomization of the protein solution by a rapid stream of gas applied to the nozzle from which protein solution is extracted (Berriman and Unwin, 1994; Feng et al., 2017; Kontziampasis et al., 2019; Lu et al., 2014; Maeots et al., 202). Alternatively, a spray can be created by ejecting a stream of droplets from a membrane vibrating with ultrasonic frequency (Ashtiani et al., 2018; Rubinstein et al., 2019), this approach however has not been combined with fast mixers to demonstrate its applicability to time-resolved cryo-EM.

Methods that aim at miniaturizing traditional sample preparation utilized a drop-on-demand (DOD) method to eject small droplets on an EM grid from a capillary followed by droplet thinning aided by metal nanowires covering the EM grid (Jain et al., 2012; US2014/0360286A1). The disadvantages of atomization using compressed air include the large sample consumptions (tens of microliters per grid) and poor control over droplet dimensions (Kontziampasis et al., 2019; Lu et al., 2014). These disadvantages can partially be overcome by more sophisticated 3D mixers and miniaturized nozzles fabricated by 3D two-photon photolithography (Knoška et al., 2020).

So, there is a need to improve time-resolved sampling for Cryo-EM, as to adapt the sampling approach to enable fast mixing of liquids in combination with accurately controlled droplet generation and cryo-EM grid preparation, and obtaining the desired time resolution, while providing for a very low sample consumption when using automated sampling means and methods.

SUMMARY OF THE INVENTION

The present invention provides for novel means and methods for time-resolved Cryo-EM sampling by applying a method using a customized setup comprising a droplet-on-demand microfluidic chip to enable fast mixing of liquids (with a time-scale ~1 ms) at low constant flow rates, with controllable DOD droplet generation, allowing low sample consumption (in the picoliter range), in combination with an improved plunger module, allowing for a very short sampling reaction time in the millisecond range until vitrification of the sample, thereby further improving the sample preparation method for tr-Cryo-EM.

In a first aspect, the invention relates to a method for time-resolved preparation of a protein sample, for analysis on a grid, preferably on a cryo-EM grid, comprising the steps of:

a. providing at least two aqueous solutions and an oil phase in different inlets of a microfluidic chip, wherein the aqueous solutions from the inlets subsequently combine into aqueous droplets encapsulated within an oil continuous phase,
b. mixing of said aqueous solutions within said droplets while flowing through the oil continuous phase in the channel in the chip,
c. followed by removal of the oil continuous phase from the channel to allow merging of the droplets containing the mixed aqueous solution in the microchannel of the chip,
d. droplet-on-demand generation of airborne droplets from the mixed aqueous solutions in the nozzle of the chip,
e. ejection of said droplets from the chip, by spraying on a grid, wherein the microfluidic chip comprises at least one nozzle tip as an outlet opening from the chip configured for droplet spraying.

In a further embodiment, the method further comprising the step of f. vitrification of the sample on the grid, by plunging the grid comprising the sample into cryogen solution, wherein said grid is held by a plunger arm.

In a specific embodiment, the flow rate of the solution in the channels of the microfluidic chip is regulated via a pressure control unit. In a particular embodiment, the flow rate is held to a constant flow rate, to provide for a flow rate suitable for removal of the oil phase through pillar-induced droplet merging. Another embodiment of the method relates to a pressure setting to 1 bar or lower for the oil composition, and a pressure ratio of the oil/aqueous phase in a range of 0.5-1.5.

In another specific embodiment, the solutions are mixed in step b. by passing through a serpentine microchannel, said serpentine channel being formed of bending regions connected by multiple arms, preferably by at least 3 arms.

Another embodiment relates to the method as described herein, wherein the droplet-on-demand generation of droplets in step d. requires the activation by a droplet on demand actuation module, as further described herein.

In another embodiment, the method wherein the sample is vitrified via plunge-freezing is mediated via a plunger arm that is connected to an arm controller unit allowing to regulate the movement of the plunger arm, by selecting a plunger time regime corresponding to a reaction delay time ($t_d$), as defined by the formula: $t_d = t_{chip} + t_{fly} + t_{plunger}$, wherein $t_{chip}$ is the time of the sample in the chip, $t_{fly}$ corresponds to the time needed for droplet to be ejected from the nozzle tip to the grid, and $t_{plunger}$ is the time the plunger needs to deposit the grid in the cryogen after droplets are sprayed on the grid. In a further specific embodiment of the method as described herein, the speed of the plunger arm is higher than 1 m/s when crossing the surface of the cryogen solution.

Further embodiments relate to the method for time-resolved preparation of a sample on a grid as described herein, wherein the oil composition comprises a fluorinated oil and a surfactant in the range of 1-10% (w/v), more preferably with a 5% (w/v) surfactant, or even more preferably a 10% (w/v) surfactant, and even more preferably the fluorinated oil is 1H,1H,2H,2H-Perfluoro-1-octanol.

The method for time-resolved preparation of a sample on a grid as described herein may further be specified by having:

- the grid placed in the grid-clip (6) of the plunger arm as described herein, and/or
- at least 2 aqueous solutions being applied to at least 2 separate inlet channels (28) and an oil composition to at least 1 third inlet channel (29) of the microfluidic chip (1) as described herein, and/or
- the pressure being controlled using a micro-processor based controller unit (42), for mixing the solutions at a constant flow rate, and/or the pressure being controlled for extraction of the oil phase from the side channels of the chip by one pressure unit being connected via tube (**3*b***) to said side channels and applying negative pressure,
- the droplet generation being synchronized by the pressure controller module using the microprocessor-based controller unit (42), and using the arm controller (11) of the plunger module to obtain a desired reaction delay time ($t_d$), and/or
- after plunge-freezing the grid in the cryogen, releasing the pressure using the pressure controller.

A further specific embodiment of the method for time-resolved preparation of a sample on a grid as described herein, envisages that the pressure control module is set for obtaining a between 2-60 μl/min in the chip, preferably between 2-10 μl/min in the chip, which allows optimal mixing conditions in chip in less than 100 ms, preferably in less than 10 ms, even more preferably in less than 1 ms.

A further specific embodiment of the method for time-resolved preparation of a sample on a grid as described herein, relates to droplet-on-demand generation via laser-induced cavitation, said method further comprising the steps of:

- switching on the pulsed laser, synchronizing the pressure with the opening of the laser aperture or shutter (27) using the microprocessor-based controller unit (42), as to focus the laser on the chip and induce cavitation for forming airborne droplets, and
- close the laser aperture or shutter (27) after spray generation, and wherein at least 1 of the aqueous solutions applied to the chip contains absorbing material at the emission wavelength of the laser, and wherein the laser is focused in the microchannel of the chip at a distance from the outlet opening (40) allowing droplet spraying, preferably between 25-50 μm from the nozzle tip. More specifically, the laser may be a pulsed laser operating with a frequency of 2000-5000 Hz, and/or have an emission wavelength of 532 nm. For the latter, the absorbing material in the solution for the chip may be Amaranth Acid red 27, preferably at a concentration of at least 6 mM in the nozzle.

A second aspect of the invention relates to a microfluidic chip (1) for mixing aqueous protein solutions and spraying droplets, more specifically for-time-resolved Cryo-EM sample prep, comprising:

a. a mixer module comprising with at least 3 inlet channels (28, 29), for addition of at least 2 aqueous solution and one oil phase in separate channels, and wherein each channel leads to one microchannel (30) for combining the solutions of the inlet channels, which is fluidly connected to a serpentine microchannel (31) comprising bending regions for mixing, connected by at least 3 arms (32), and
b. a droplet merging module comprising: a main microchannel (34) for passing the oil-encapsulated aqueous solution droplets flowing from the serpentine microchannel (31) of a., and intersected by at least one side channel (35), which is configures as oil outlet from the main microchannel (34), for pillar-induced droplet merging, and wherein each of the inlet channels (28, 29) of the mixer module (a), and optionally the side channel(s), are further connectable to a pressure control module configured to control the pressure in the inlet (28, 29) and/or side channels (35).

In a specific embodiment, said microfluidic chip droplet merging module for pillar-induced droplet merging comprises at least one side channel (35) that is transversely intersecting the main microchannel (34), and comprising an array of pillars (36), wherein said pillars each comprise a flat surface that is lining the wall of the main microchannel (34), each flat surface of said pillars separated from the next pillars flat surface at a distance (d1), which is smaller than the droplet diameter, or is at least 2 times smaller than the width of the main microchannel (34) (d2), and wherein said array of pillars is at a distance (d2) of the opposite wall of the width of the main microchannel, wherein d2 is substantially the same or larger than the width of the main microchannel (34), and the pillars extend from the flat surface into the side channel (35). In a further particular embodiment, the chip droplet merging module may comprise 2 side channels as oil outlets, wherein said 2 side channels are on opposite sides of the main microchannel (34), and both intersect the main microchannel wall by the flat surfaces of the row of pillars, wherein the pillars are at a distance d2, which is the width of the main microchannel, and possible the same as the width of the serpentine channel.

Another specific embodiment relates to the microfluidic chip for mixing aqueous protein solutions and configured for Droplet-on-demand spraying, by further comprising:

c. a droplet generation module comprising: at least one nozzle (38) comprising a chamber (39), fluidly connected on one end to the main microchannel (34) of b., and forming an outlet opening (40) to the outside of the chip for depositing the droplets out of the chip on the other end.

In a further specific embodiment, the microfluidic chip as described herein has rectangularly-shaped cross-sections of its microchannels (30, 34), more particularly with an aspect ratio below 2, and a maximum height of 80 μm±10 μm, preferably 50 μm±10 μm.

Another specific embodiment provides for a microfluidic chip wherein the droplet generation module comprises a microchannel (37) fluidly connected to the main microchannel (34) of b. on the one end, and to at least two nozzles (38) on the other end, wherein each chamber (39) of said nozzles ends in an outlet opening (40) to the outside of the chip, wherein the chambers may specifically be rectangularly shaped (39), and/or wherein the outlets are made by a plane surface.

In particular, the microfluidic chip as described herein may be fabricated by interconnectably having the modules made of silicone elastomer, preferably said silicone elastomer such as polydimethylsiloxane (PDMS), or a thermoplastic polymer, or alternatively glass. Alternatively, said modules may be made of glass. In a further specific embodiment, the microfluidic chip as described herein provides for said interconnected modules being mounted on a flat surface material, wherein said flat surface material may be optically transparent, for lases-induced cavitation droplet actuation, such as glass, or quartz and/or wherein said glass has a thickness of 250 μm or less, or is suited for different modes of droplet on demand actuation, such as a flat surface material including a miniaturized piezoelectric actuator. In another specific embodiment, to allow droplets to eject from the chip, the microfluidic chip made of modules in a silicone elastomer mounted on a flat surface material has the nozzle tip(s) or outlet opening(s) as a hole protruding from these materials in one plane, i.e. a flat opening or opening made by cutting of the materials in the same plane.

A third aspect of the invention relates to a plunger module for controlled plunge-freezing of a grid, more specifically for vitrification of time-resolved samples on grid, comprising:

a. a plunger arm (5), which is rotatable around a horizontal axis, comprising a holder for a grid (6) on one end of the arm, and b. a rotational voice coil comprising an electrical coil (7) and stationary permanent magnets (8) on the other end of the arm to drive its movement, as well as c. an optical encoder comprising a rotatable code wheel (9) and a detector (10), positioned at the rotation axis of the arm, to steer and detect movement of the arm, and d. an arm controller unit (11), for remote electrically controlling the movement of the arm via the current through the coil, wherein the plunger arm is mounted on a solid structure (43) at its rotation axis, for positioning the arm on a further support structure, and wherein the arm controller unit (11) is electronically connected to the encoder and rotational voice coil.

A fourth aspect relates to an integrated device for time-resolved preparation of a sample comprising:

i. the microfluidic chip for mixing and DOD generation, as described herein, connected to a pressure control module for control of the flow rate in the channels of the chip (1), ii. a droplet actuation module for controlled DOD spraying of droplets from the nozzle outlet opening from the chip of a., iii. the customized plunger module for time-resolved action to vitrify the grid, as described herein, iv. a cryogenic module, and v. a microprocessor-based controller unit (42) configured to synchronize and control the movement of the plunger arm via the arm controller unit (11), with the pressure control module, and regulate the thermostatic cryogenic module, and wherein the components i. to iv. are mounted on one or more support structures configured to allow plunge-freezing of a grid held by the plunger module (c) after droplets generated by the microfluidic chip (1) have been sprayed on the grid.

In another embodiment, said integrated apparatus has components i. to iv. mounted on solid support structure(s) as follows: the microfluidic chip (1) is mounted on a XYZ (24*b*) stage which is on a holder (24) positioned on a motorized XY stage (23), which also has the plunger module and cryogenic module mounted on it, and wherein the relative position of the plunger module to the chip allows plunger arm (5) movement parallel to the plane of the nozzle outlet opening of the chip (1), and wherein said movement positions the grid clip (6) when holding a grid with its grid surface parallel to the surface of the nozzle outlet(s) (40) at a distance below 1 mm.

A specific embodiment relates to the integrated apparatus wherein the droplet actuation module allows for laser-induced cavitation, and comprises:

a pulsed laser (17) connected to an automated aperture or shutter (27) and a power meter (26), and, an optical module for focusing the laser on the nozzle of the chip (1), wherein the pulsed laser is focused at a point in the nozzle (38) at a distance suited for generating droplet and spraying from the nozzle tip, in particular preferably in the range of 25-50 μm from the nozzle outlet opening (4).

In a more particular embodiment, the integrated apparatus comprises an optical module comprising: an objective lens (18) for focusing the laser beam on the nozzle (38) of the chip (1), and one or more optical elements selected from the group of elements comprising: a beam expander (21), a prism, mirrors, a beam splitter (22), an optical microscope (19), and/or a camera (20), wherein said objective lens (18) is mounted to be movable for focusing the laser (17) on the nozzle (38) of the chip (1).

Another specific embodiment relates to the integrated apparatus as described herein, wherein the cryogenic module comprises a cryogenic container (12) for vitrification of the grid, optionally with a lid on top of the container (15) configured for to keep cold gas in the container, a thermostated reservoir (13), and/or a holder for a grid box (14).

A final aspect relates to the use of the microfluidic chip, the plunger module, or the integrated apparatus as described herein, or the use of the method as described herein, for time-resolved sample preparation, more specifically, for protein sampling, more particularly for tr-Cryo-EM sampling. Alternative embodiments relate to a method for time-resolved preparation of a sample on a grid as described herein, using the microfluidic chip, or the plunger module, or the integrated apparatus as described herein.

DESCRIPTION OF THE FIGURES

The drawings described are only schematic and are non-limiting. In the drawings, the size of some of the elements may be exaggerated and not drawn on scale for illustrative purposes.

FIG. 1A, the integrated apparatus as shown here is composed of a microfluidic chip (1) as described herein (also see FIG. 3), wherein the inlet channels (28, 29) are connected to a pressure control module which is composed of a flow reservoir (3) for each inlet channel, connected via tubing to a flow meter (FM) between the reservoir and the inlet channel, and controlled by a pressure controller (4) for each inlet channel, optionally, an additional pressure controller (4) can be present for adding a negative pressure connected via a tube (3*b*) to the side channels for oil removal (35, FIG. 3); optionally the pressure control module(s) are connected to a (personal) computer (PC); the chip (1) is mounted on a manual XYZ stage (24*b*), held by the holder (24), which is in its turn mounted on a motorized XY stage (23) which also has the plunger arm module (also shown in FIG. 1B) and the cryogen module mounted on it, in such a relative position as to have the plunger arm (5) and grid-clip mechanism (6) for an EM grid less than 1 mm from the nozzle tip on the chip (1), and the nozzle tip above the surface of the cryogen (at a distance preventing freezing of the chip by cryogen). The cryogen module as presented herein is composed of a cryogenic container (12) for liquid nitrogen, covered by a lid (15) with an opening above the reservoir (13) for ethane, and a grid box holder (14) and housed grid box (14*b*) for storing EM grids. The droplet actuation module comprises the laser (17), with a shutter (27), after which the laser beam intensity is monitored by a power meter (26), going through a beam expander (21), and further comprises an optical module, which allows to focus the laser beam on the nozzle for laser-induced cavitation, wherein said module as shown herein comprises a beam splitter (22), an optical microscope (19), and a camera (20), as well as an objective lens (18). Optionally, after the beam splitter (22), a diffractive beam splitter (44) is introduced, to divide the single laser focus point into a linear array of equidistant focused laser spots. FIG. 1B, the plunger module is mounted via a mounting post (43) to a mechanical XY stage (25), which is attached to the motorized XY stage (23). The plunger module comprises the plunger arm (5), containing on one end the grid-clip mechanism (6) for holding the EM grid, the arm being moveable around a horizontal axis, which at its rotation point has an optical encoder comprising a rotating code wheel (9) and a detector (10) to allow control of the movement of the plunger arm by an electronically connected arm controller unit (11, see FIG. 4). Said unit controls the movement by sending a current to the electrical coil (7), which is a part of the rotational voice coil with stationary permanent magnets (8) at the other end of the plunger arm.

Figure 1A:
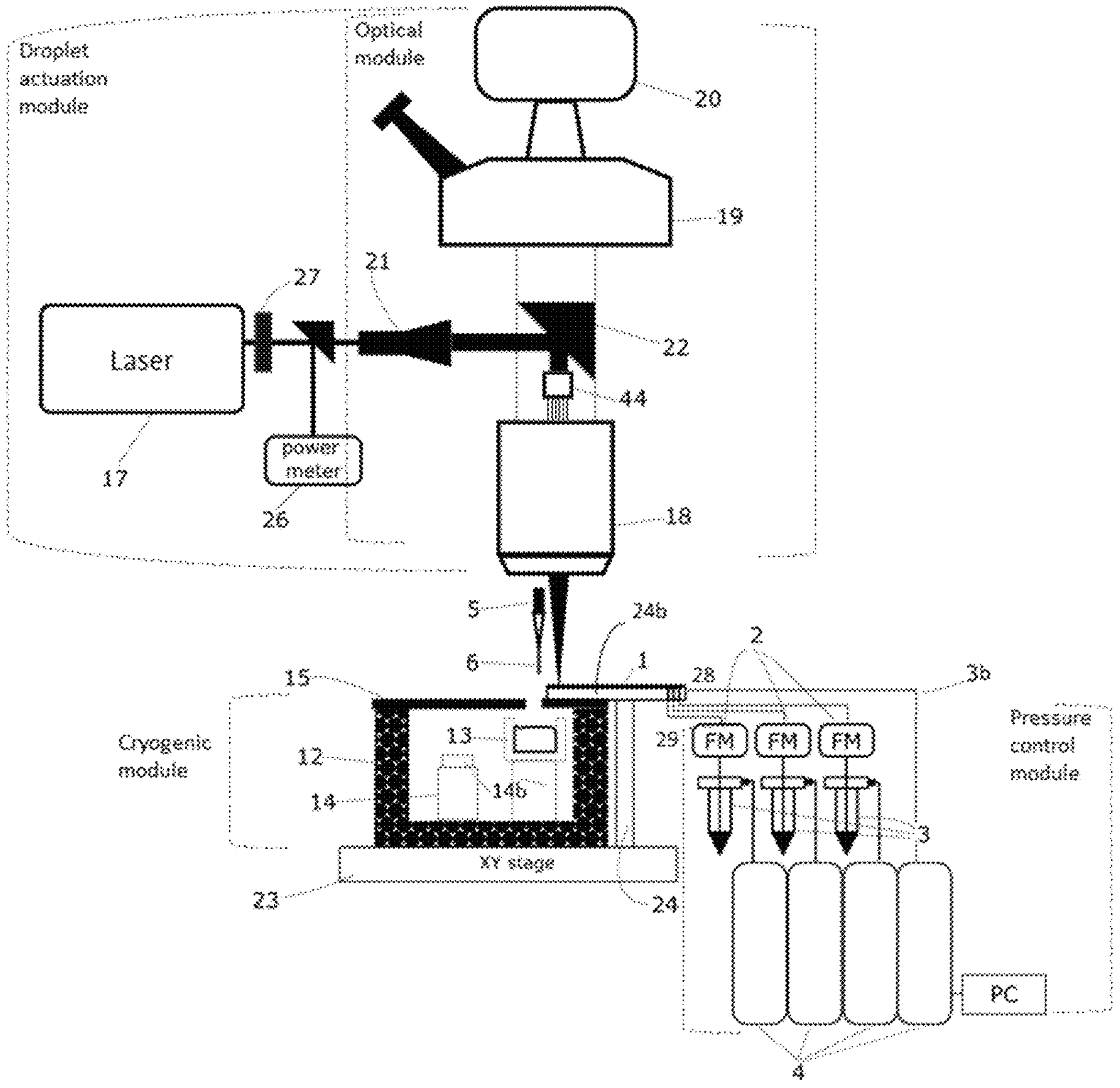
FIGS. 1A and 1B. Schematic overview of the integrated apparatus (A) and the plunger module (B).

The microfluidic chip (1) is mounted on the XYZ stage (24*b*), held by the holder (24), mounted on the motorized XY stage (23). The plunger arm is mounted on a post (43) that is attached to a mechanical XY stage (25), enabling fine alignment of its position on the motorized XY stage (23) with the grid clip (6) relative to the nozzle of the microfluidic chip (1). The plunger arm (5) is driven by voice coil comprising a permanent magnet (8) and an electrical coil (7) mounted on the rotating arm (5) on the opposite end of the grid clip (6). The arm position and is controlled by an optical encoder containing a code wheel (9) and an optical detector (10). So the plunger arm (5) of the plunger arm module with its grid clip mechanism (6) is positioned so that the grid, when present in the grid-clip mechanism (6), is in line with the centre of the reservoir for ethane (13), present in the cryogenic container (12) of the cryogenic module, and allowing to move the arm so as to be presented at the nozzle tip at the outside of the chip (1) to receive the droplets, followed by plunging the grid in the reservoir.

Figures 3, 3A, 3B, 3C:
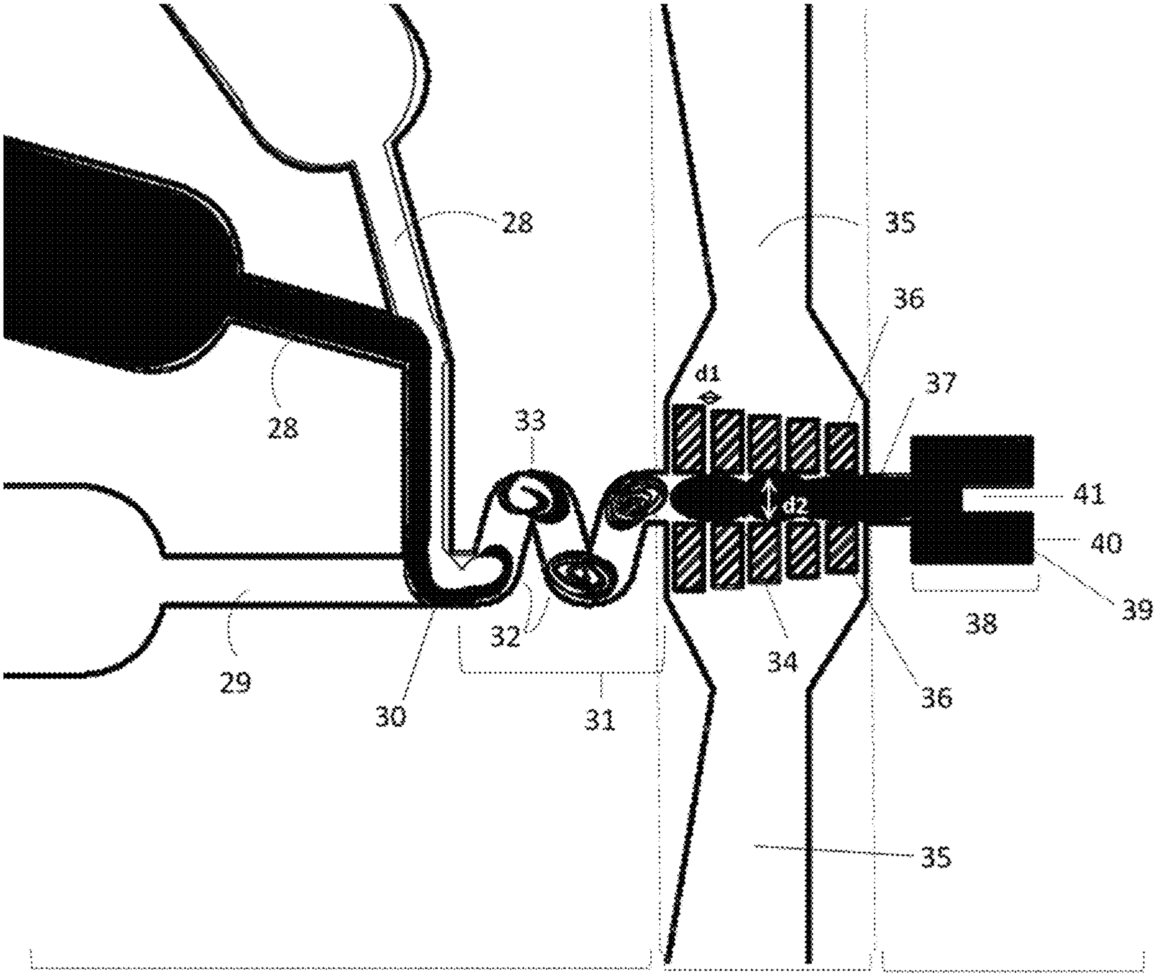

FIGS. 3A-3C. Design of the microfluidic chip when operated.

The solution comes in via the inlet channels in the mixing module (FIG. 3A), to provide for mixed oil-encapsulated droplets in the droplet merging module (FIG. 3B) where the oil phase is extracted to form an aqueous fluid for the droplet generation module (FIG. 3C), which induces the formation of droplets in the nozzle for spraying; the nozzle is shown here in a configuration of a double nozzle with two outlets (FIG. 3C). 28, inlet channel for aqueous solution; 29, inlet channel for oil composition; 30, microchannel for combining the inlet channels solutions; 31, serpentine channel with arms (32) and bending regions (33); 34, main microchannel for the aqueous droplets and solution in droplet merging module; 35, side channel for oil removal; 36, pillars at a distance d1 from each other within an array of pillars, and the arrays of pillars from each side channel being at a distance d2 from each other, lining the wall of the main microchannel (34); 37, optional microchannel in the droplet generation module to end in the nozzle (38), which is constituted of one or more chambers (39), and a corresponding number of outlet opening to the outside of the chip (40), also called nozzle tip, for spraying of the droplets on a droplet recipient (e.g. an EM-grid), with thin walls (41) between the multiple outlets.

Figure 4A:
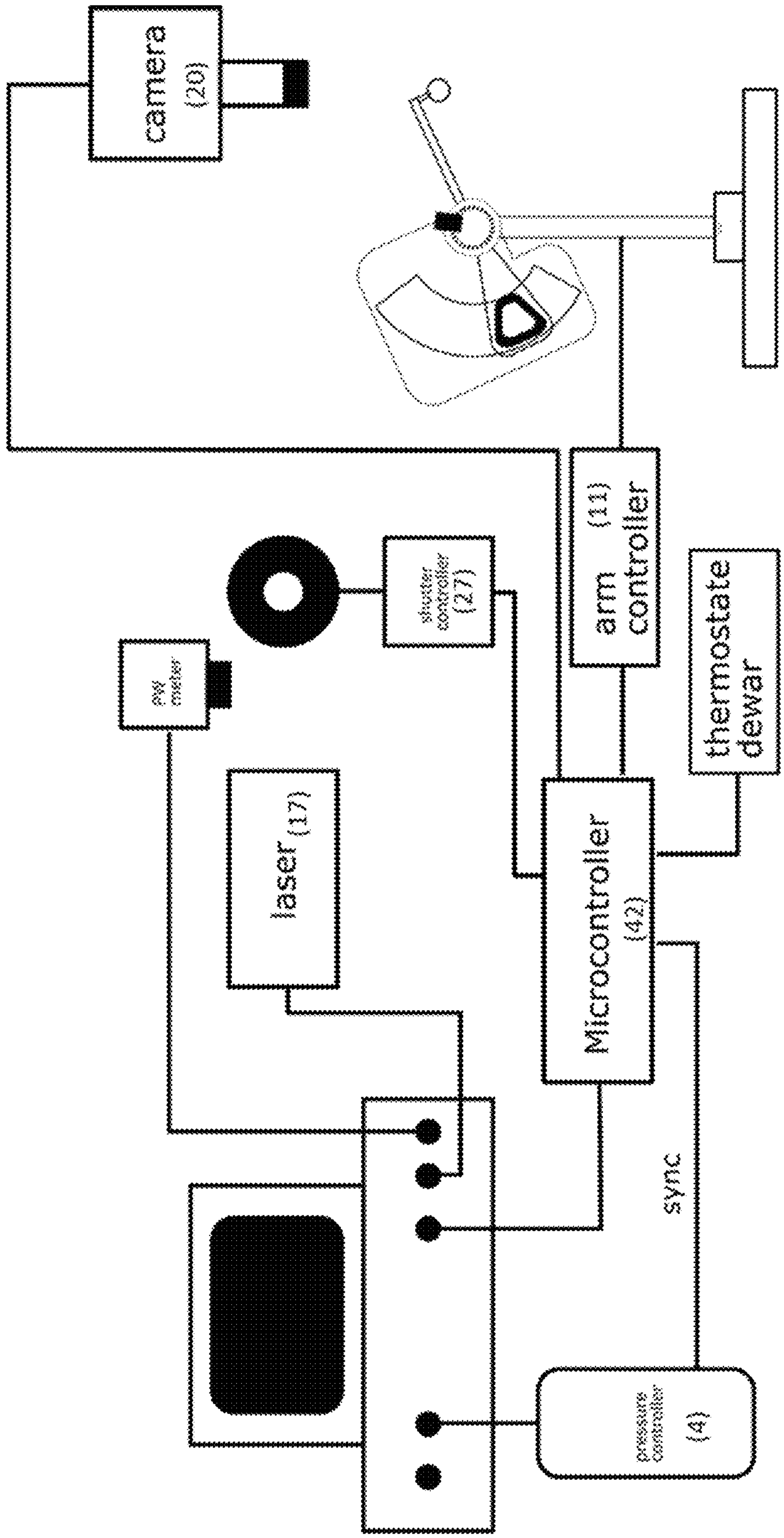
Figure 4B:
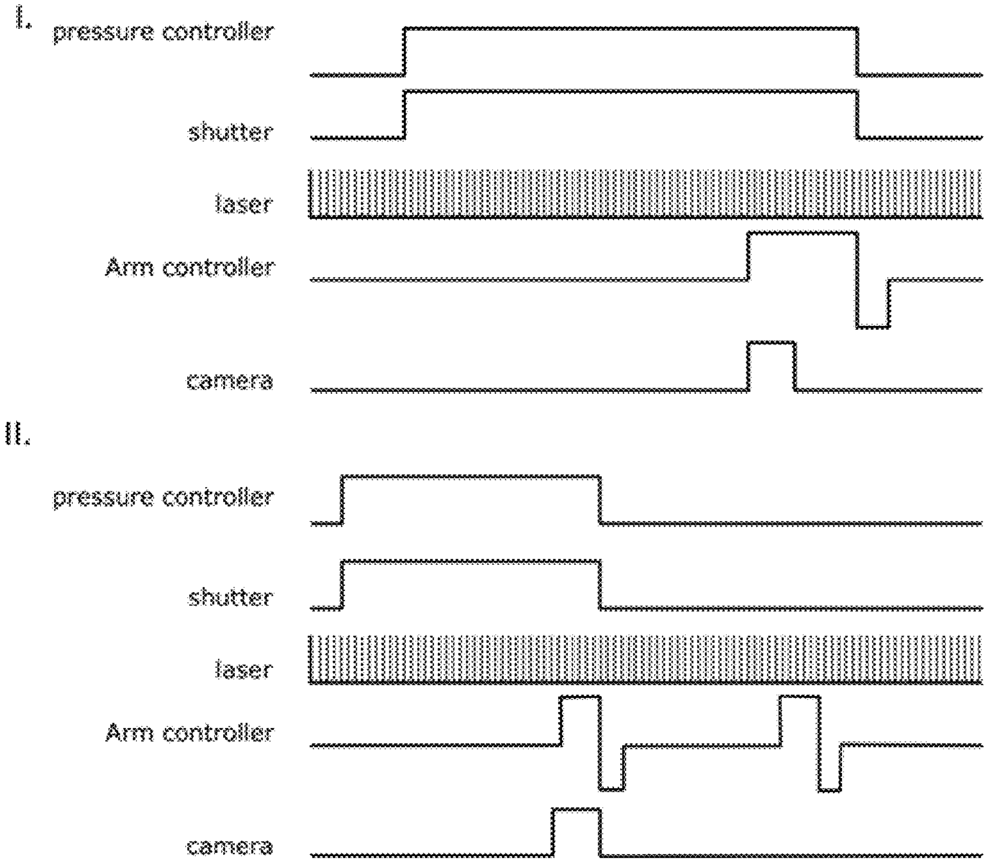

FIGS. 4A and 4B. Block scheme of electronic control units and synchronization scheme.

Figure 1B:
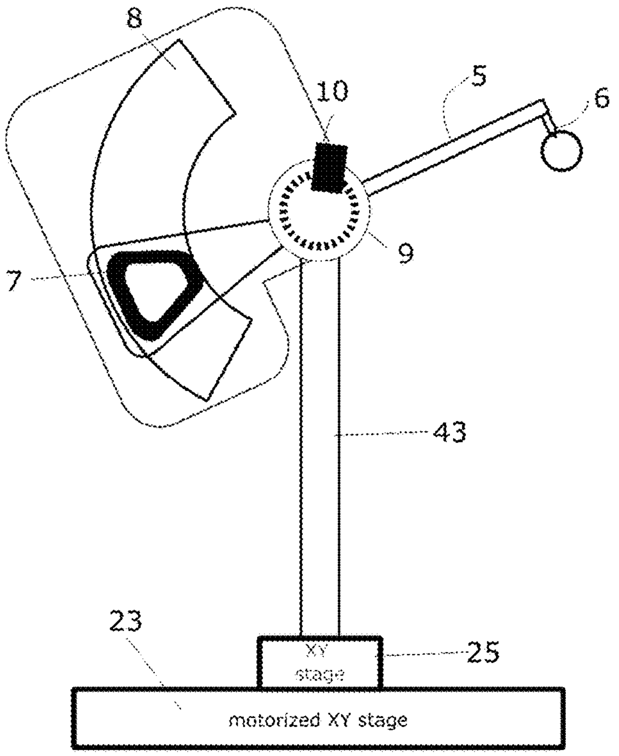
Figure 2:
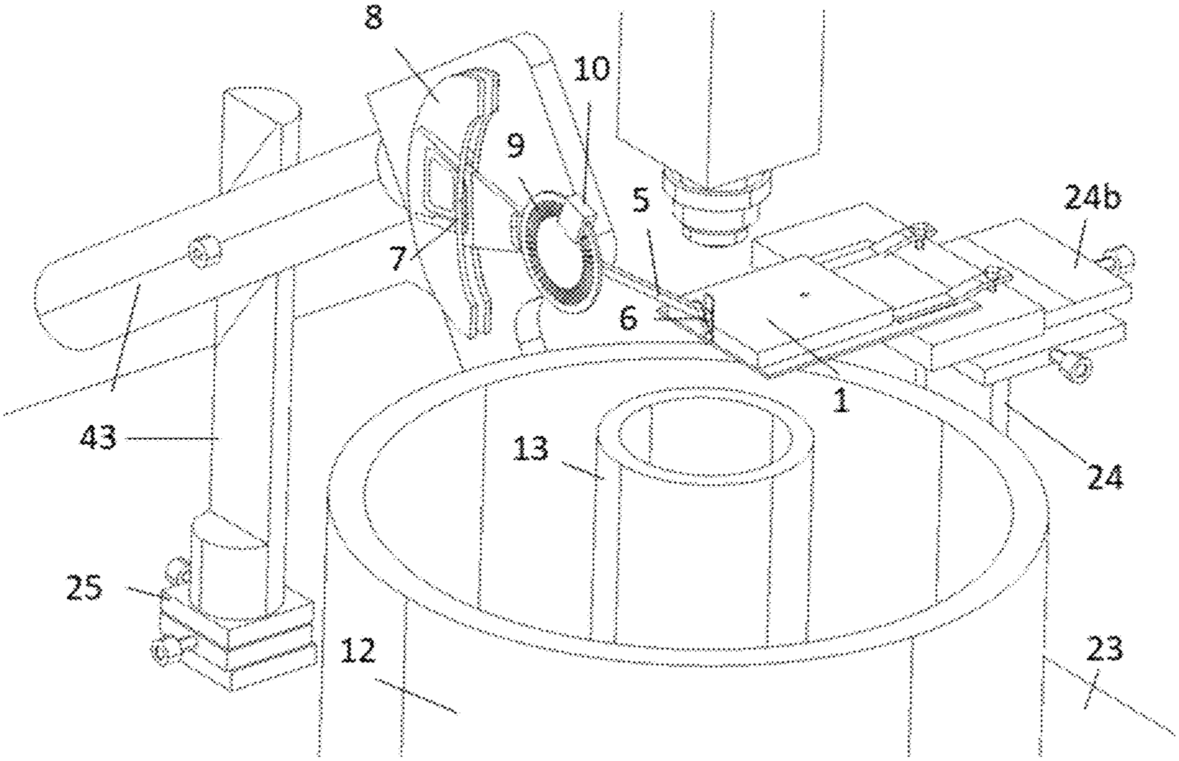
FIG. 2. Three-dimensional representation of the plunger module relative to the positioned microfluidic chip and the cryogen reservoir in the integrated apparatus.

FIG. 4A) Block diagram of electronic modules controlling the operation of the integrated device, showing the microprocessor-based controller (42), for computer-controlled operation of/and connected to the plunger arm controller (11), the thermostat of the cryogenic container (dewar) (12) of the cryogenic module, the pressure control module (4), and the droplet actuation module, in this specific case the laser (17), the power meter (26) and the shutter or aperture of the laser (27), with reference signs cited herein as appearing in FIGS. 1-3; FIG. 4A) timing and synchronization of the different modules' processes taking place during sampling in 2 modes: I) fast (short reaction delay time) and intermediate (mid reaction delay time) sampling mode, II) slow (long reaction delay time) sampling mode.

Figure 5:
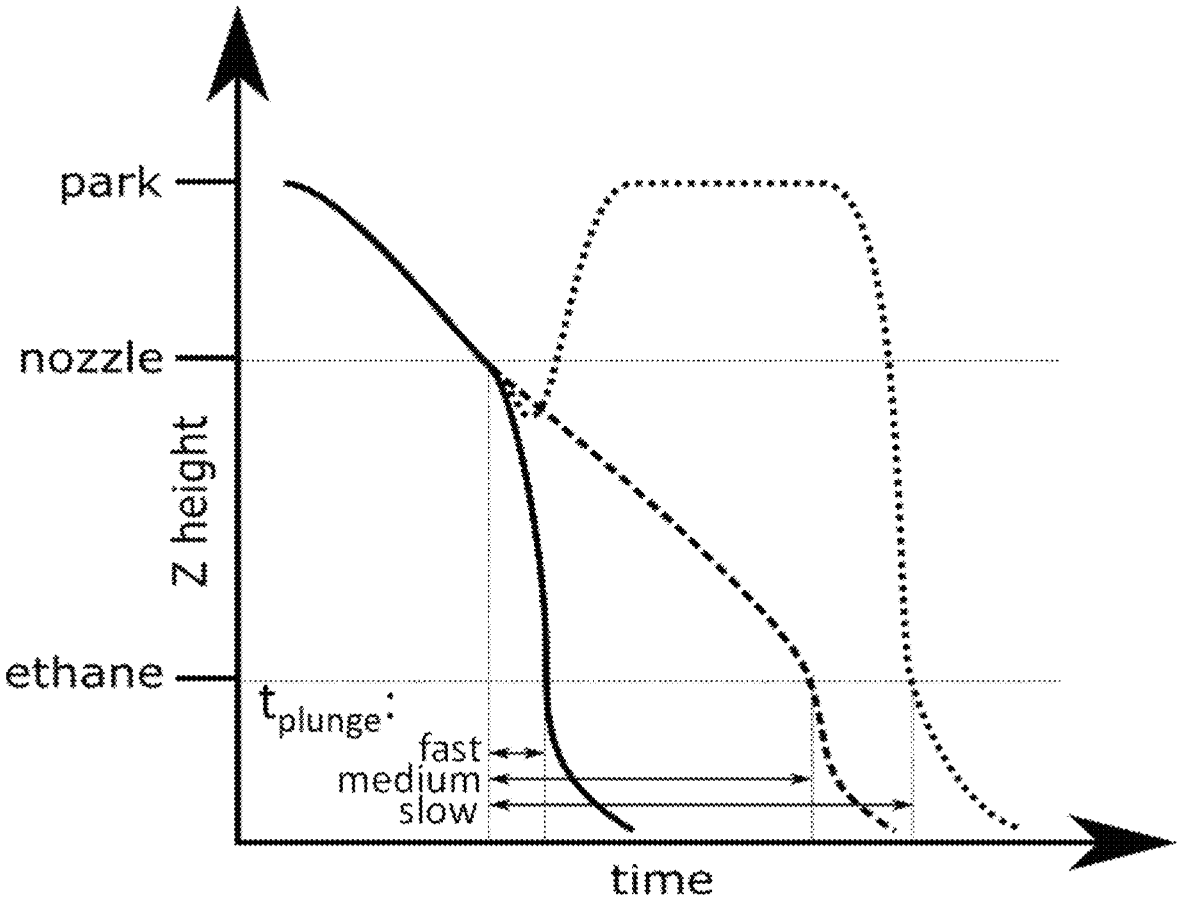

FIG. 5. Plunger arm trajectories.

The plunger arm movement is shown relative to the time for the three reaction delay time regimes: continuous line—fast/short, dashed line—intermediate/medium, dotted line-slow/long. Corresponding plunging delay time intervals $t_{plunger}$ are indicated (arrows). The Z-height axis represents vertical position of the EM grid mounted in the clamp (6) and labelled as follows: park—highest position of the arm represents a stable position where arm is parked when setup is at rest and in which the EM-grid is placed above the microfluidic chip such that it does not receive a stream of generated microdroplets; nozzle—position in which the grid passes in front of the nozzle of the microfluidic chip; ethane—arm position in which the grid enters the liquid ethane.

Figure 6A:
Figure 6B:
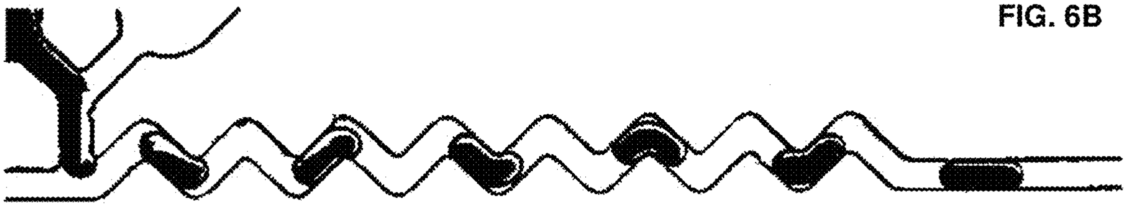
Figure 6C:
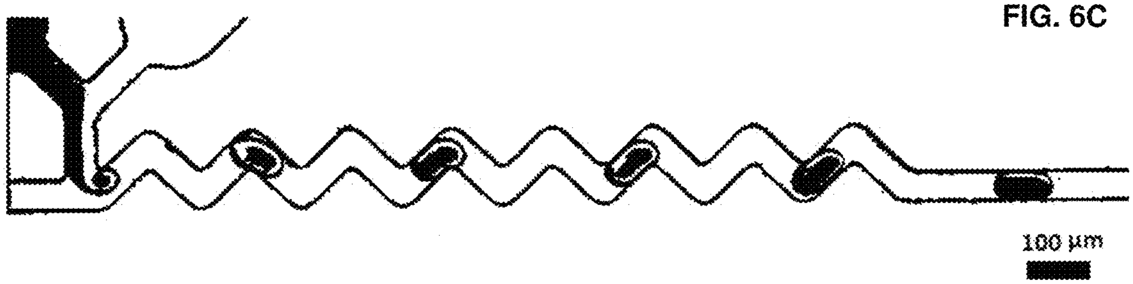

FIGS. 6A-6C. Visualisation of a test mixing module in operation as to form oil/water solution droplets.

A test for the evaluation of the minimum number of turns in the serpentine microchannel that is needed to achieve optimal mixing of the aqueous solutions, at an applied pressure for the oil and water phase inlet channels of (FIG. 6A) 80 and 85 mbar, (FIG. 6B) 120 and 115 mbar (FIG. 6C) 160 and 140 mbar, respectively.

Figure 7:
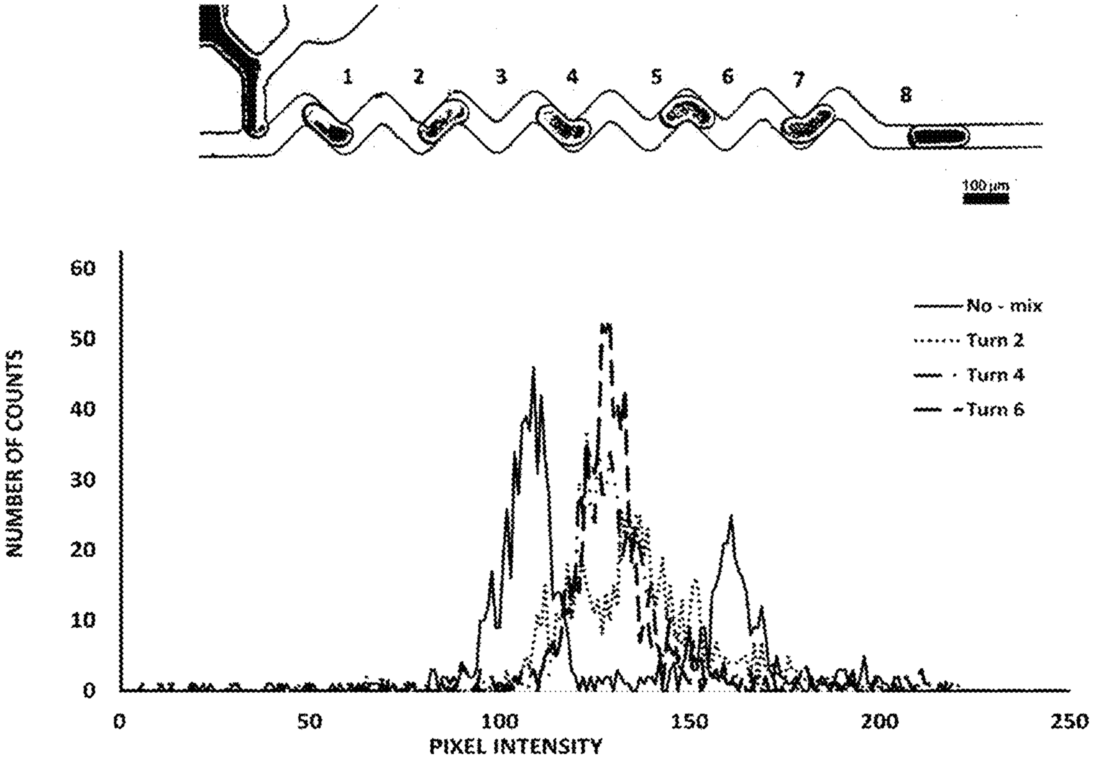

FIG. 7. Mixing module serpentine microchannel analysis.

The top image shows a screenshot of the visualized mixing module in the test evaluation run. The numbers (1 to 8) indicate the position after each bending of the channel at which the mixing grade was measured. In the bottom image, the plot shows the histogram of the pixel intensity in a droplet for the no-mixing condition and when it occupies position 2, 4 and 6. At the beginning, each histogram shows clearly the presence of two distinct populations, a peak at lower intensity corresponding to the dye solution and one at higher intensity corresponding to the water. When a droplet advances along the serpentine, distribution of pixels intensities become more uniform.

Figure 8C:
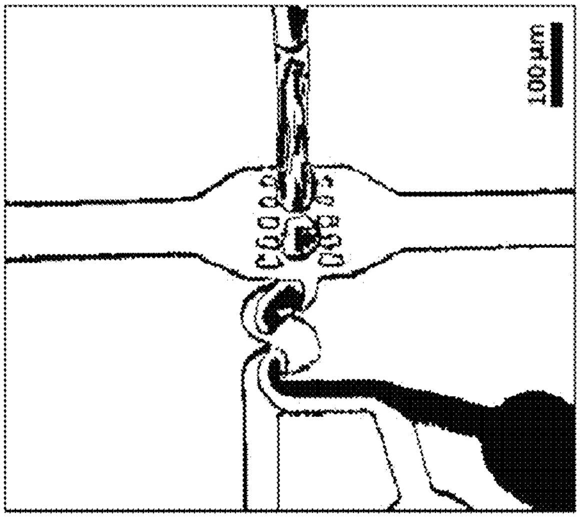
Figure 8B:
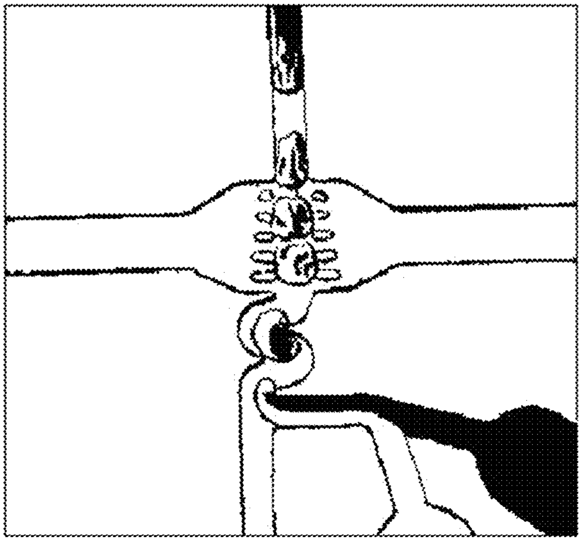
Figure 8A:
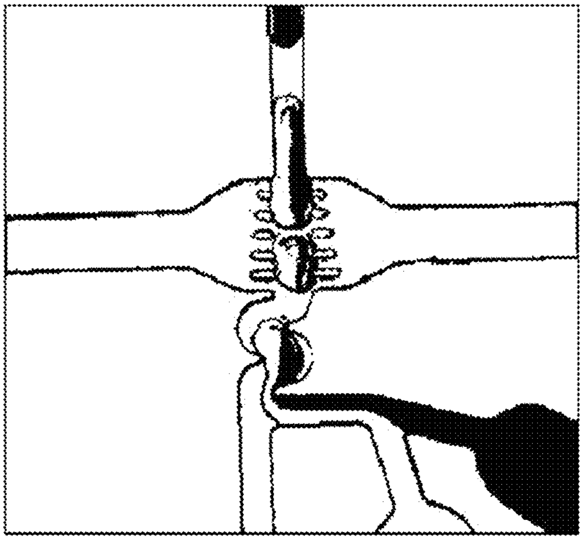

FIGS. 8A-8C. The microfluidic chip in operation.

Figure 8D:
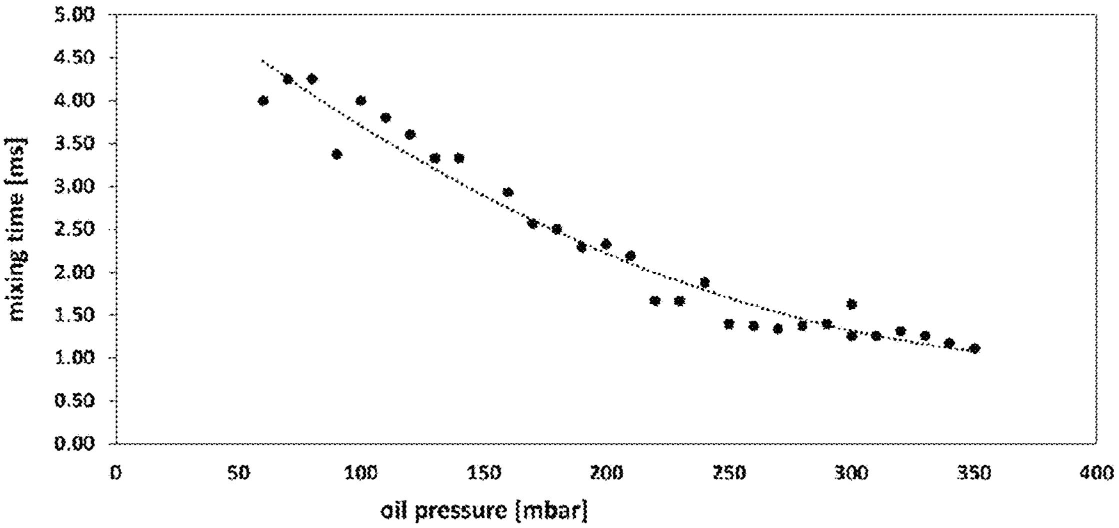

Droplet generation and fast mixing occurs at an applied pressure for the oil and water phases of 80 and 50 mbar (FIG. 8A), 120 and 70 mbar (FIG. 8B), 160 and 180 mbar (FIG. 8C), corresponding respectively to a mixing time of about 4.5, 3.5 and 2.5 ms. (FIG. 8D) In the bottom part of the image, experimental data show the relation between the mixing time and the applied pressure.

Figure 9:
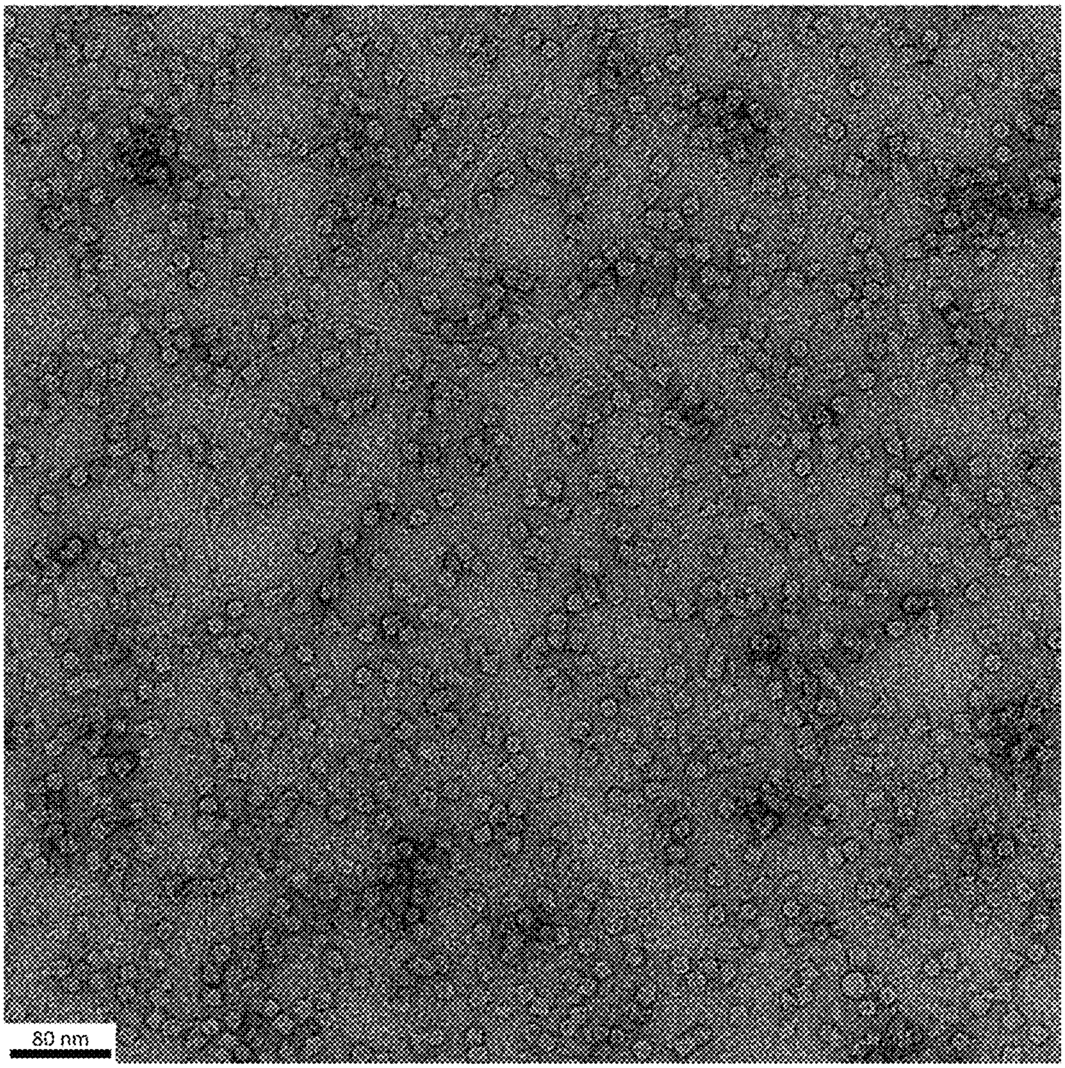

FIG. 9. Negative stain image of a protein sample on an EM-grid.

The grid was prepared by spraying the droplets of GroEL-containing solution on the grid using a straight microfluidic channel and the laser induced cavitation approach. The grid was passed in front of the nozzle, followed by application of the negative stain solution (without blotting). The image shows the characteristic shape and structural features of GroEL indicating that the protein structure is intact.

FIGS. 10A-10D. Cryo-EM grid with protein sample vitrified using the integrated apparatus.

(FIG. 10A) Full grid area. Droplets (the darkest regions indicate areas covered with a droplet) are arranged roughly along a straight line consistent with the expected pattern for a grid passing in front of the nozzle in the direction perpendicular to the direction of jetting droplets generated at regular frequency from the chip. (FIG. 10B) and (FIG. 10C.) Higher magnification images showing the spreading of the droplets at the edges and (FIG. 10D) high magnification image of a thin ice area displays single particles of GroEL protein embedded in vitreous ice with high contrast.

FIGS. 11A-11D. Cryo-EM analysis of *E. coli* GroEL chaperone protein.

Figure 11A:
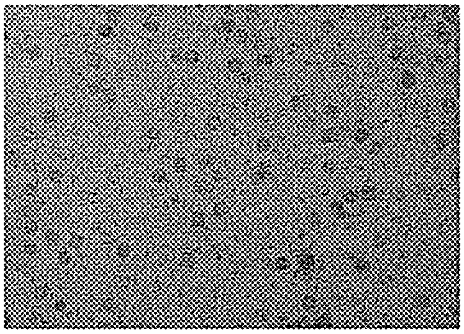
Figure 11B:
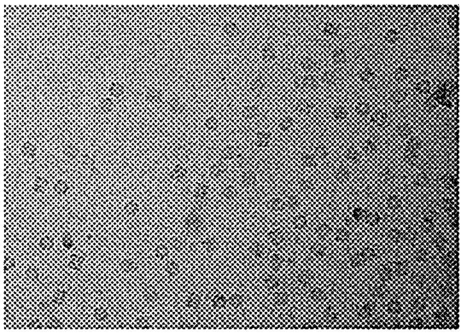
Figure 11C:
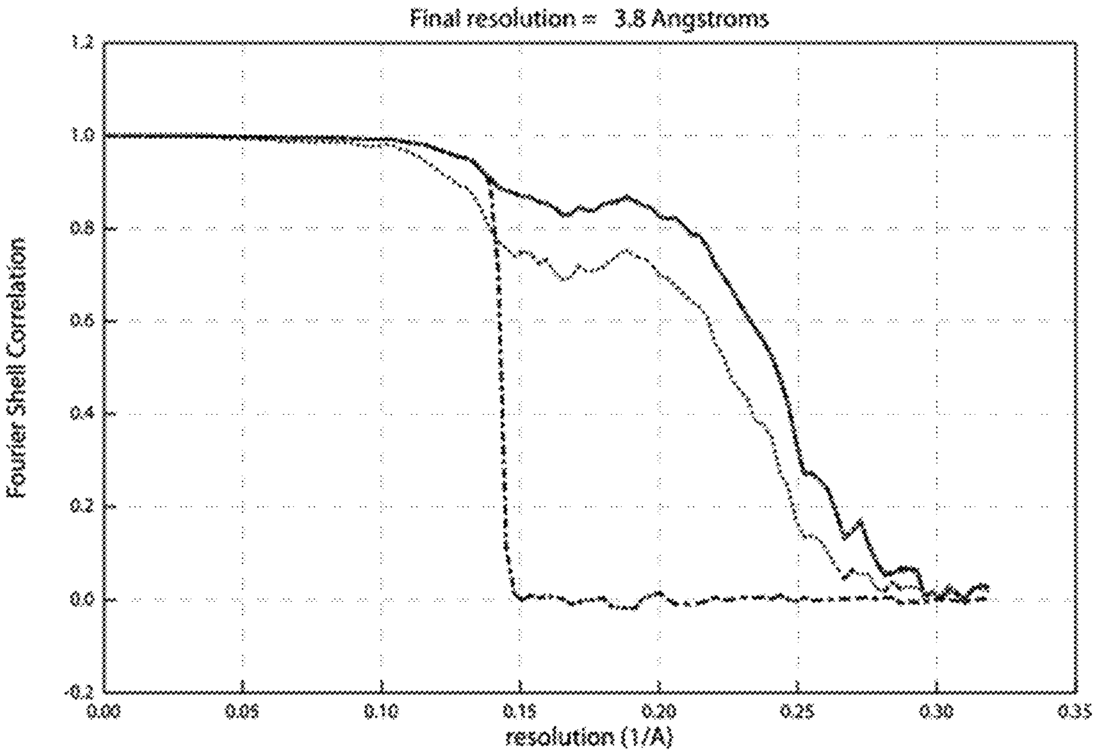
Figure 11D:
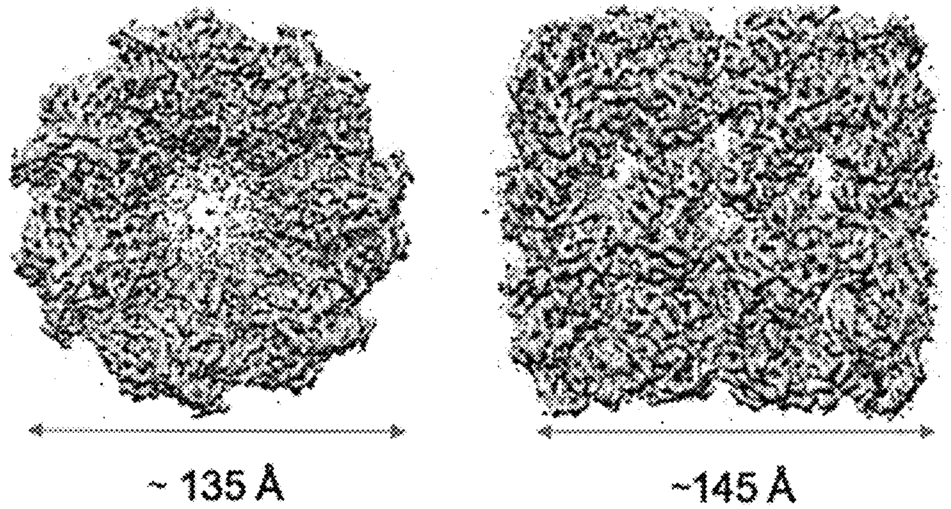

FIGS. 11A and 11B, two images acquired from the grids prepared using the developed spraying and plunging module. The experiment was performed using a microfluidic chip with a single straight channel to generate droplets through laser induced cavitation. Cryo-EM images (FIGS. 11A and 11B) show the protein particles with characteristic features of *E. coli* GroEL chaperone protein. FIG. 11C, a Fourier Shell Correlation (FSC) of the 3D map (shown in FIG. 11D) reconstructed from the cryo-EM dataset as collected from the grids plunged with the plunger module used herein. The FSC curves showed that the structure of GroEL was resolved to resolution of 3.8 Å, thereby demonstrating that protein structure is preserved to high resolution when droplets are generated by laser-induced cavitation and that cryo-EM samples produced in such a manner are suitable for high-resolution reconstruction of protein structure.

Figure 12:
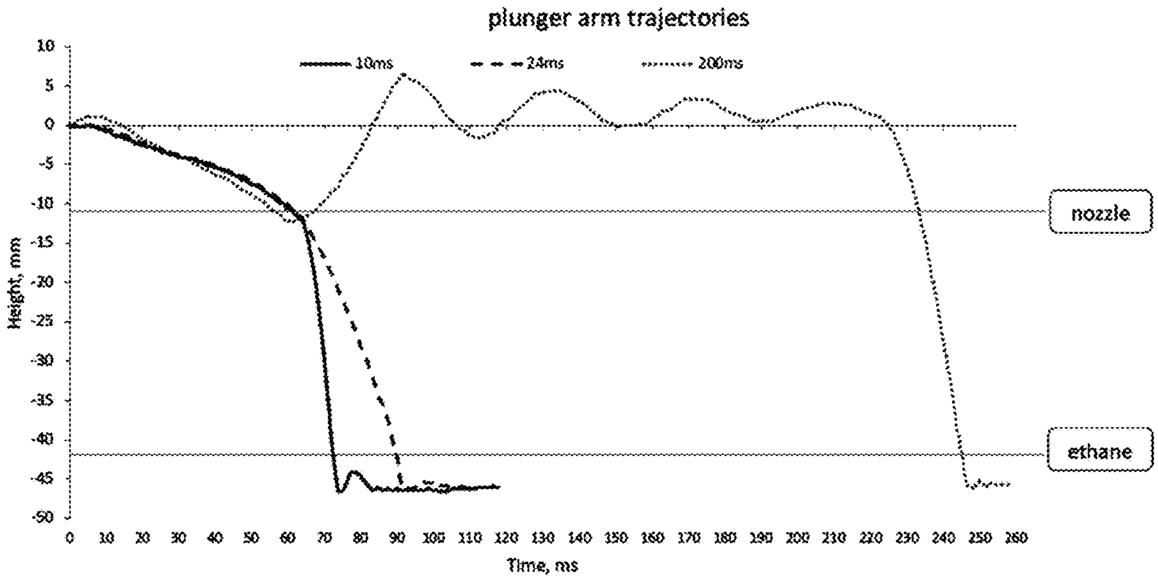

FIG. 12. The measured trajectories of the plunger arm for three regimes of actuation.

Trajectories of the EM grid in the grid clip of the moving plunger arm for fast (solid line), medium (dashed line) and slow (dotted line) activation regimes. The height corresponds to the arm position along the vertical axis, zero height corresponds to the rest position or parked position of the plunger arm. The positions of the arm corresponding to the grid placed opposite to the nozzle of the microfluidic chip (the position in which spray droplets hit the EM grid) and the grid entering the liquid ethane vial (which corresponds to freeze time and lowest position of the arm) are indicated by lines labelled 'nozzle' and 'ethane', respectively.

Figure 13:
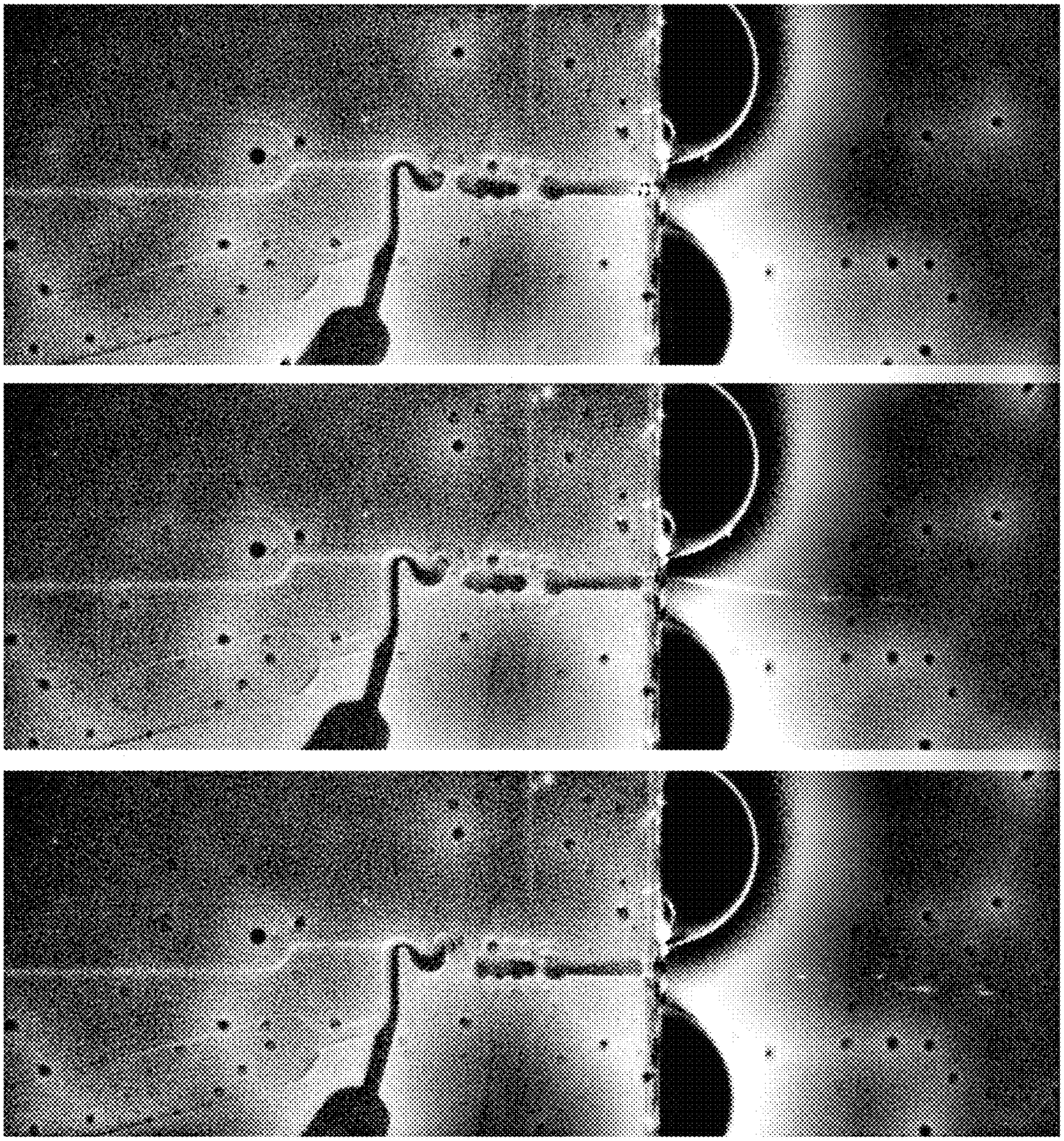

FIG. 13. Images of videorecording showing the microfluidic chip in operation.

Water-in-oil droplet formation, mixing, droplet merging and sample droplet spraying from the nozzle tip.

Figure 14:
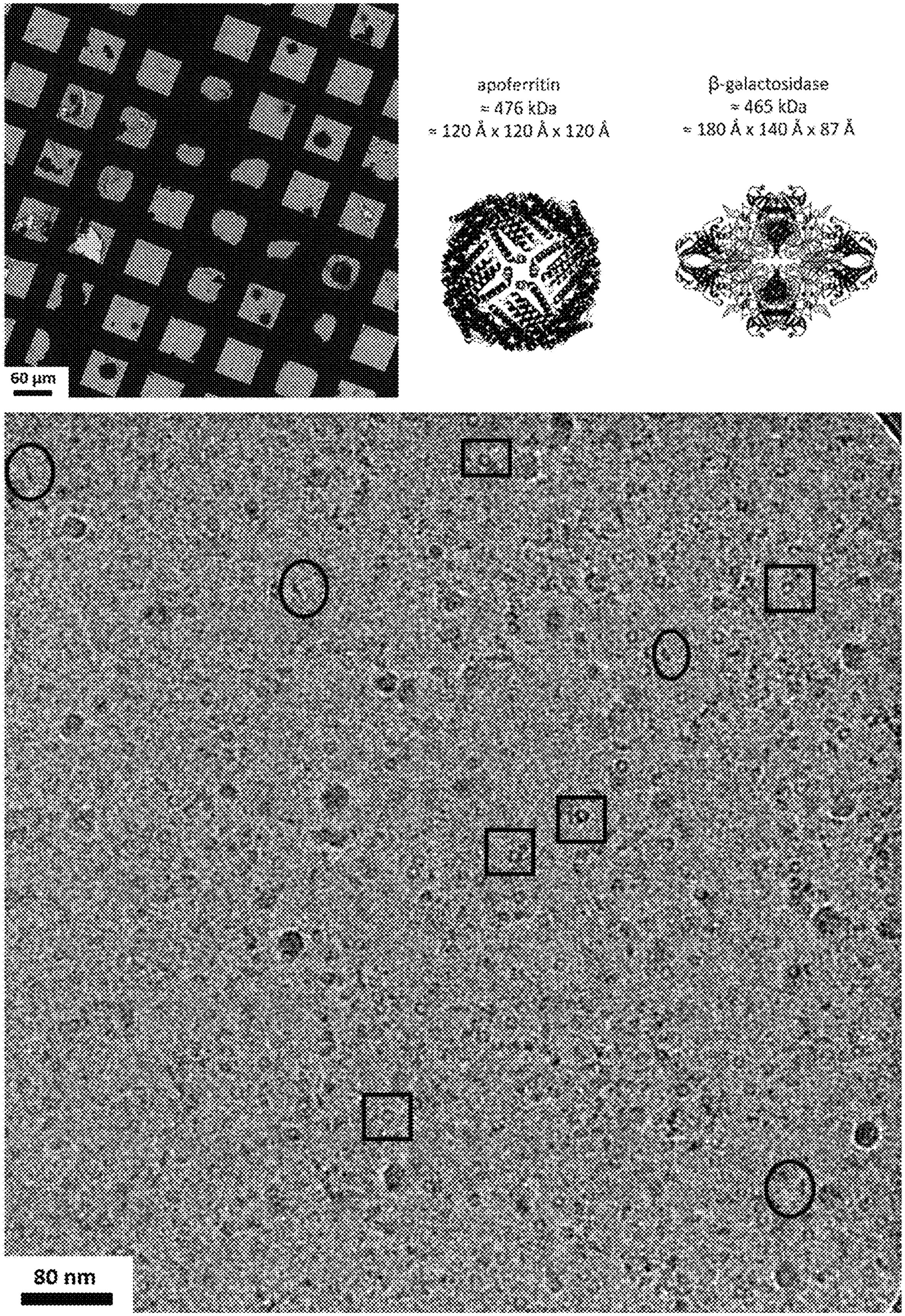

FIG. 14. Protein sampling using the integrated device results in cryo-EM samples suitable for high-resolution structural analysis.

Top left: sprayed droplets on a plunged cryo-grid. Top right: schematic presentation of the structural dimensions, shape, and size of the apoferritin and beta-galactosidase proteins used for sampling to test the integrated device. Bottom: Cryo-EM image of the plunged grid, showing that both proteins are visible. The circles indicate some of the round shaped apoferritin proteins (squares) and of the rhomboidal shaped beta-galactosidase (circles).

FIGS. 15A-15D. Protein sampling using the integrated device results in cryo-EM samples suitable for high-resolution structural analysis.

Figure 15A:
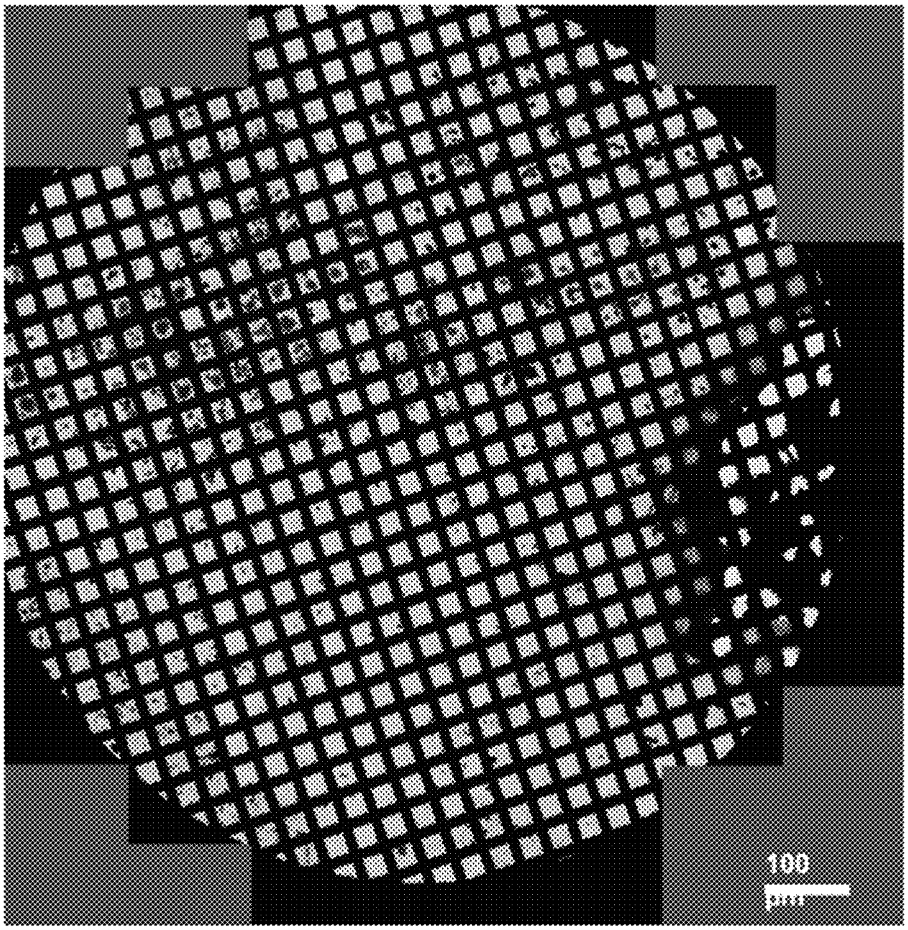
Figure 15B:
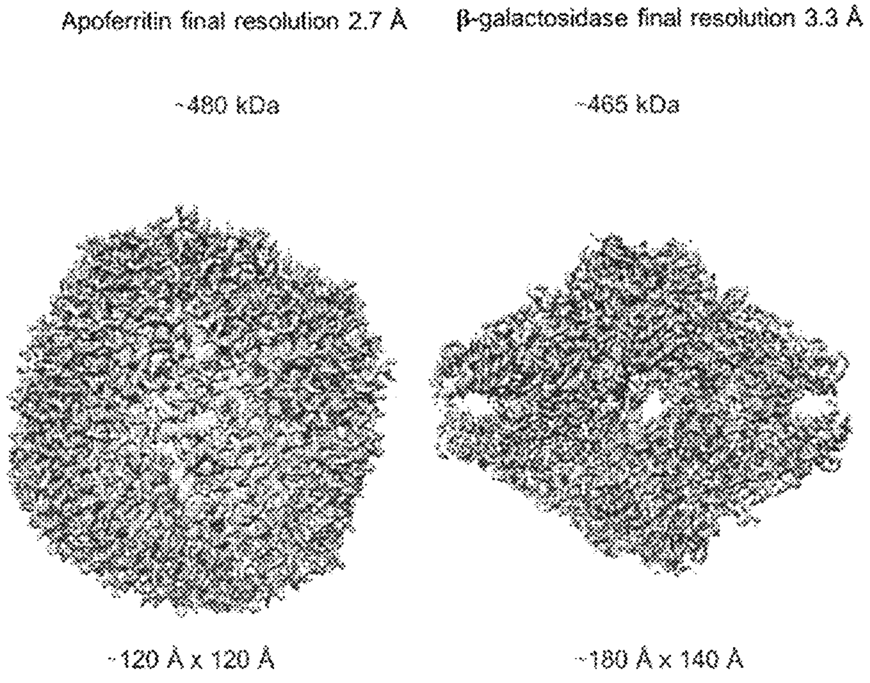
Figure 15C:
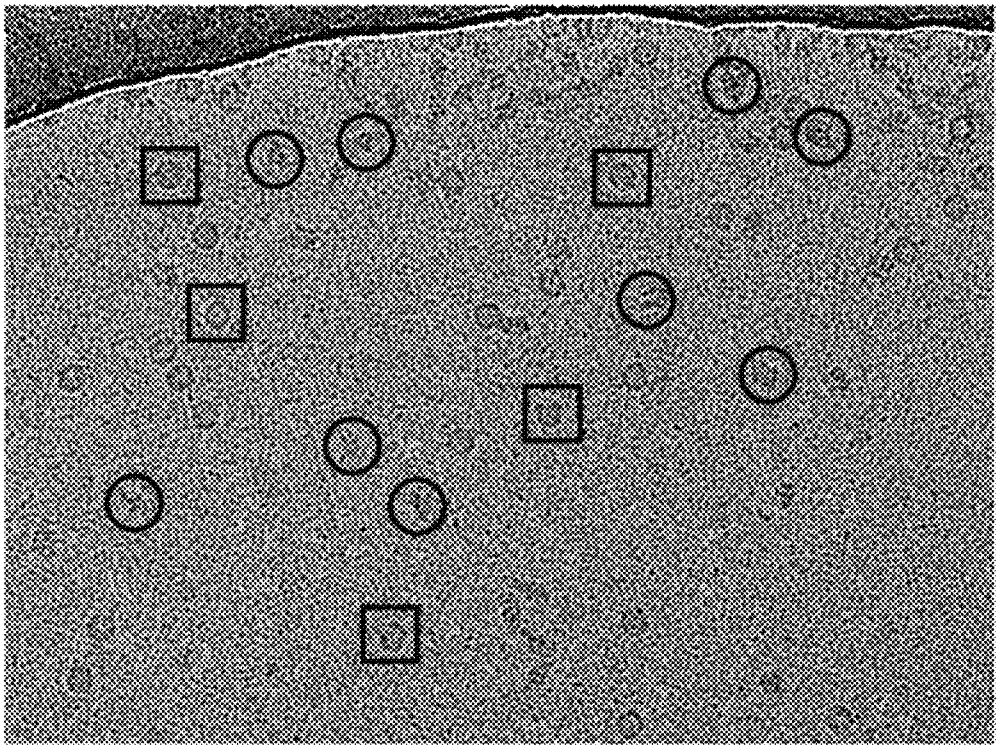
Figure 15D:
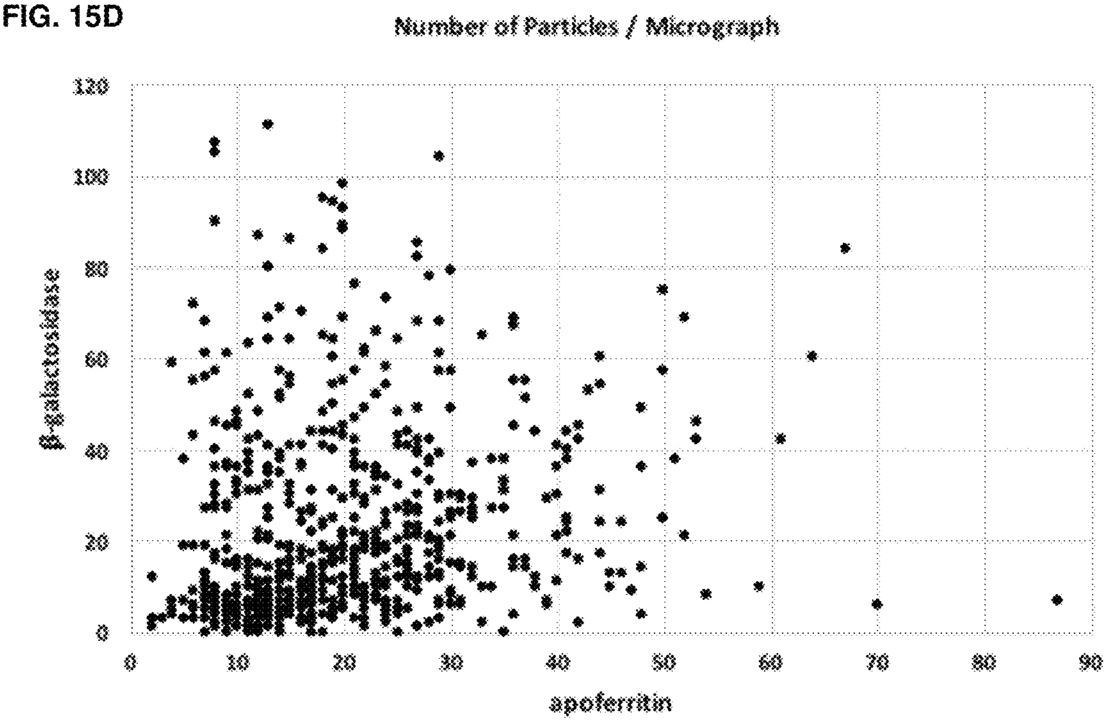

FIG. 15A) overview of a cryo-EM grid with solutions of apoferritin and β-galactosidase mixed on the microfluidics chip and sprayed on the grid before plunge freezing the grid in liquid ethane. FIG. 15B) High magnification cryo-EM micrograph of the plunged grid shows both proteins in the same imaging area. The squares indicate some ball-shaped apoferritin particles and circles—the rhomboidal shaped β-galactosidase particles. FIG. 15C) 3D reconstructions of apoferritin and β-galactosidase were obtained from the grid to resolution 2.7 and 3.3 Å, respectively. FIG. 15D) The graph reports the distribution of the number of apoferritin and β-galactosidase particles on the micrographs collected from the cryo-EM grid.

Figure 16:
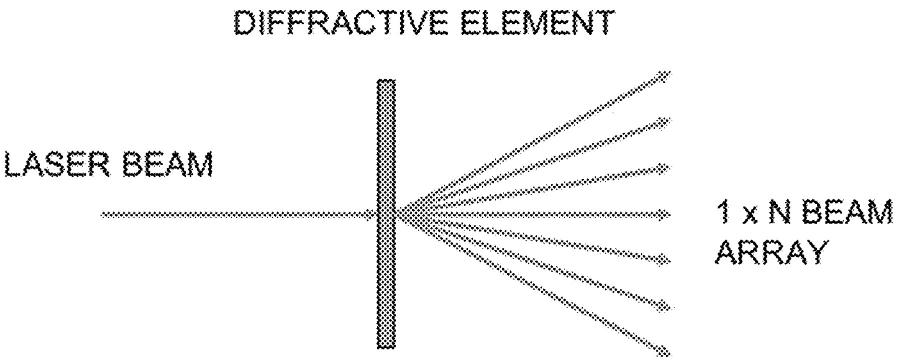
Figure 16:
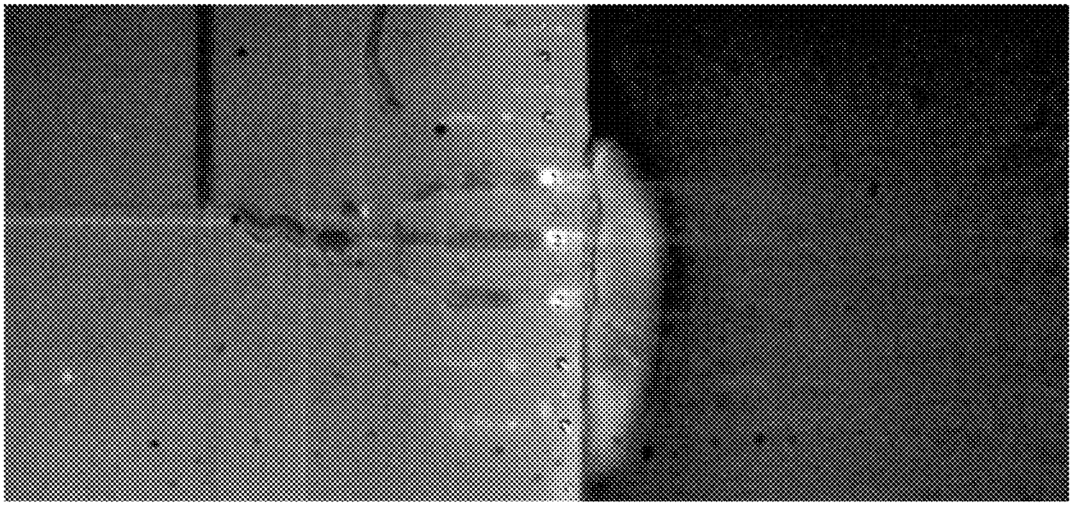

FIG. 16. Generation of spray from multiple nozzles using split laser beam.

Top: operation principle of a linear diffractive beam splitter. The optical element splits a single focused laser beam into a defined number of equiangularly distributed laser beams with a similar intensity. Bottom: a screen shot from a recorded video of an operating spray generator with three nozzles and laser beam split into seven focal points with similar laser intensity. The image shows a laser beam focused on each nozzle and the spray being ejected simultaneously from each of the three nozzles.

DESCRIPTION

The present invention will be described with respect to particular embodiments and with reference to certain drawings but the invention is not limited thereto but only by the claims. Any reference signs in the claims shall not be construed as limiting the scope. Of course, it is to be understood that not necessarily all aspects or advantages may be achieved in accordance with any particular embodiment of the invention. Thus, for example those skilled in the art will recognize that the invention may be embodied or carried out in a manner that achieves or optimizes one advantage or group of advantages as taught herein without necessarily achieving other aspects or advantages as may be taught or suggested herein. The invention, both as to organization and method of operation, together with features and advantages thereof, may best be understood by reference to the following detailed description when read in conjunction with the accompanying drawings. The aspects and advantages of the invention will be apparent from and elucidated with reference to the embodiment(s) described hereinafter. Reference throughout this specification to "one embodiment" or "an embodiment" means that a particular feature, structure or characteristic described in connection with the embodiment is included in at least one embodiment of the present invention. Thus, appearances of the phrases 'in one embodiment' or 'in an embodiment' in various places throughout this specification are not necessarily all referring to the same embodiment but may.

Definitions

Where an indefinite or definite article is used when referring to a singular noun e.g. "a" or "an", "the", this includes a plural of that noun unless something else is specifically stated. Where the term "comprising" is used in the present description and claims, it does not exclude other elements or steps. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments, of the invention described herein are capable of operation in other sequences than described or illustrated herein. The following terms or definitions are provided solely to aid in the understanding of the invention. Unless specifically defined herein, all terms used herein have the same meaning as they would to one skilled in the art of the present invention. Practitioners are particularly directed to Sambrook et al., Molecular Cloning: A Laboratory Manual, $4^{th}$ ed., Cold Spring Harbor Press, Plainsview, New York (2012); and Ausubel et al., Current Protocols in Molecular Biology (Supplement 114), John Wiley & Sons, New York (2016), for definitions and terms of the art relating to molecular biology or biochemistry. For the field of microscopy, particulars in the art are described in for instance: Heath,J P., Dictionary of Microscopy, 2005, Wiley; Hajibagheri M. A. Nasser, Electron Microscopy Methods and Protocols, 1999, Humana Press, vol 117. Unless defined otherwise, all technical and scientific terms used herein have the same meaning as commonly understood by one of ordinary skill in the art (e.g. in molecular biology, biochemistry, structural biology, computational biology, microscopy, and/or mechanics).

The terms "protein", "polypeptide", and "peptide" are interchangeably used further herein to refer to a polymer of amino acid residues and to variants and synthetic analogues of the same. A monomeric or protomer is defined as a single polypeptide chain from amino-terminal to carboxy-terminal ends. A "protein subunit" as used herein refers to a monomer or protomer, which may form part of a multimeric protein complex or assembly. The term "molecular complex" or "complex" refers to a molecule associated with at least one other molecule, which may be a protein or a chemical entity. The term "associating with" refers to a condition of proximity between a chemical entity or compound, or portions thereof, and a binding pocket or binding site on a protein. As used herein, the term "protein complex" or "protein assembly" or "multimer" refers to a group of two or more associated macromolecules, whereby at least one of the macromolecules is a protein. A protein complex or assembly, as used herein, typically refers to binding or associations of macromolecules that can be formed under physiological conditions. Individual members of a protein complex, such as protein subunits or protomers, are linked by non-covalent or covalent interactions. The term "multimer(s)", "multimeric complex", or "multimeric protein(s) or assemblies" comprises a plurality of identical or heterologous polypeptide monomers. Polypeptides can be capable of self-assembling into multimeric assemblies (i.e.: dimers, trimers, pentamers, hexamers, heptamers, octamers, etc.) formed from self-assembly of a plurality of a single polypeptide monomers (i.e., "homo-multimeric assemblies") or from self-assembly of a plurality of different polypeptide monomers (i.e. "hetero-multimeric assemblies").

A 'microfluidic chip' is a set of micro-channels etched or molded into a material (e.g. glass, silicone or polymer). The micro-channels forming the microfluidic chip are connected together in order to achieve the desired features (mix, pump, sort, or control the biochemical environment). This network of micro-channels trapped into the microfluidic chip is connected to the outside by inputs and outputs pierced through the chip, as an interface between the macro- and micro-world. The simplest current microfluidic device consists in micro-channels molded in a polymer that is bonded to a flat surface (such as a glass slide). The polymer most commonly used for molding microfluidic chips is PolyDimethylSiloxane (PDMS). PDMS is a transparent, biocompatible, deformable and inexpensive elastomer. It is easy to mold and bond on glass.

The term 'post' or 'post stand' or 'mounting post' as used herein is a type of stand often used with microscopes, or in the case described herein with equipment in a microscopical environment, such as the plunger arm module. The post stand consists of a single post rising vertically from the base with the capability to rotate the part mounted on top of the post around a horizontal axis, as a rotatable alternative option to the fixed arm stand.

A 'stage' as used herein is a flat plate where the modules can be mounted on, and brought into relative position to each other as described for the integrated apparatus herein. A stage may be a 'mechanical stage' containing at least a plate and further also knobs to manually turn as to move the mounted part in a certain direction (e.g. a XY mechanical stage, to move in X and Y direction), or further electronic means to position the mounted parts on the 'motorized' stage in a certain direction.

DETAILED DESCRIPTION

The present invention provides for an integrated apparatus comprising three main components commonly known to be required for time-resolved (cryo-EM) sample preparation on a grid:

a) a microfluidic chip for sample mixing and generation of airborne microdroplets;

b) a droplet actuation system for spray generation of airborne droplets;

c) a plunger, designed or readapted, for time-resolved plunging of the sample grid.

In the currently reported systems applying microfluidic-based mixers, the mixing is achieved by inducing chaotic advection in the channels (Chen et al., 2015), which is obtained by reaching values of flow velocities that fall out of the laminar flow regime. The mixing is also enhanced by narrowing the channel at the end (Kontziampasis et al., 2019), or by introducing bending of the channel (Chen and Frank, 2015), or using 3D features (Maeots et al., 2020). With this approach, the flow rate and consequently sample consumption cannot be significantly reduced, and the operating flow rate remains at hundreds μL/min.

The most frequently used approach for sample application on a grid by droplet ejection or spray generation from the microfluidic chip is based on gas-assisted aerosol generation (Chen et al., 2015; Feng et al., 2017; Kontziampasis et al., 2019; Lu et al., 2014). This method implies the presence of an additional channel on the chip through which a pressurized gas (i.e. $N_2$ or compressed air) is flown. Alternative methods for spray generation include methods based on the use of a piezoelectric transducer (Rubinstein et al., 2019)) or surface acoustic waves (Ashtiani et al., 2018). The time resolution for sampling achieved with such methods is in the order of 20-30 ms, including the time to mixing, flying of the droplets from the nozzle to the grid, and plunging the grid into cryogen. Moreover, sample consumption requires at least several microliters per grid, which is a disadvantage when low abundant proteins or small amounts are available. Dandey, et al. (2020) provided for an approach of preparing time-resolved cryo-EM samples by spraying two droplets by a Droplet-on-demand method to the same position on the EM grid, using sample volumes reduced to the picoliter range and a time resolution for sampling in the range of 100 ms. However, active mixing of solutions is not possible, neither is the fine-tuned control of sampling timing.

The present invention provides for a solution to several of the above problems by further customizing the specific needs for tr-Cryo-EM sample preparation, wherein the methods and devices as presented herein allow for accurate and fast mixing of protein solutions, tunable DOD spraying on a grid, controlled and coordinated vitrification, and a controlled reaction delay time regime, all controllable at a low flow rate to prepare grids using very low amounts of sample. As further discussed below, the reaction delay time may be selected for as a short, medium or long regime time, which is the time between initiation of mixing and grid plunge-freezing. The microfluidic chip as described herein functions to provide for rapid mixing: a mixing time down to 1 ms is possible using this device, and at least 20-30 ms (see Example 4) has been demonstrated in combination with the other modules in the integrated apparatus of the present invention. Moreover, the chip provides for a regulated spraying of droplet on grid by DOD. The method and microfluidic chip for mixing and DOD as described herein thus combines specific steps and features, respectively, leading to fast mixing and controllable spraying on a grid, using low amounts of sample, a combination that has not been used so far in time-resolved sampling. Furthermore, the integrated device comprising the microfluidic chip for mixing and generation of airborne microscopic droplets using a DOD approach (possibly actuated by laser-induced cavitation in the exemplified prototype), in a time needed for mixing ($t_{chip}$) as controlled by the flow rate in the channel, and a time required for the droplets to be ejected on the grid ($t_{fly}$), further provides for the combined use with a customized cryo-plunger in which the plunging time regime $t_{plunger}$ can be programmed, and resulting in reaction delay times ($t_d$=sum of $t_{chip}+t_{fly}+t_{plunger}$) in the range between the shortest achievable reaction delay time (ca. 1 ms) and a few seconds time interval, according to the sampling needs. Moreover, the microfluidic chip functions at low pressures (<1 bar) and due to controlled generation of every single drop for spraying, and controlled plunging, the sample consumption per grid can be reduced to below 1 μl, preferably below 0.1 μl even more preferably below 1 nl.

It is thus clear to the skilled artisan that the improvement of sampling in its time-resolution by using the device as disclosed herein, is obtained by a combination of mixing, flying, and plunging time. The features and steps provided herein to improve the mixing time, which is the time between merging of the solutions and encapsulation in droplets in oil phase, and ejection of the solution from the chip by the spraying. Indeed, the mixing is faster as compared to existing methods due to the presence of the oil-driven encapsulation of the aqueous droplets, and the presence of the serpentine channel to increase active mixing of the solutions in said droplets. Moreover, the pillar-induced droplet merging prevents that oil is present on the grid when merged droplets are sprayed from the chip, thereby also contributing to the time-resolution as this may impact 'fly time' or the 'time for generation of spray and spreading of droplets by DOD' on the cryo-EM grid. In addition, the plunging time being defined by the specifics of the plunger is the time between deposition of the droplets on the grid and freezing them in the liquid ethane. Said final vitrification step is inherent to sample preparation for Cryo-EM and thus provides for an additional contribution to the improvement of the time-resolution and time-resolved sample preparation. Indeed, the properties of the plunger described herein provide for a controlled plunger arm movement in such a way that this allows fast action, using the voice coil, and enhances the transfer capacity of the grid between nozzle and ethane. So the plunger module as described herein is adapted to be specifically suitable for Cryo-EM, allowing for adjustment of the reaction delay time in time-resolved sample prep. Hence, the integrated device and method as described herein makes trCryo-EM sample preparation more practically achievable and reproducible.

The complete setup of the integrated apparatus for preparation of time-resolved cryo-EM sampling (e.g. as exemplified by the scheme in FIG. 1) contains at least the microfluidic chip (FIG. 3), connectable to a pressure control module, a plunger module (FIGS. 1B and 2) with a cryogenic station as known by the skilled person and described herein, and a droplet actuation module, as known by the skilled person, which may for instance be an optical module for laser-induced cavitation, a miniaturized electrical heater for thermally-induced cavitation, a piezoelectric transducer, a gas-assisted aerosol generator; wherein the operation of the integrated sampling device is controlled by a microprocessor-based controller unit and optionally a computer (e.g. as shown in FIG. 4). Said microprocessor-based controller unit allows to drive the dedicated arm controller unit controlling the movement of the plunger arm in a synchronized manner with the pressure application defining the flow rate of the solutions in the microfluidics device. The integrated apparatus and the method for sampling as described herein thus makes use of a novel combination of sampling features essential to obtain time-resolved preparations, and thereby solves the problem of how to optimize tr-Cryo-EM sampling allowing controlled reaction delay times and only requiring minimal amounts of protein sample. The advantage of reducing protein sample amounts to the µl to nl range, in combination with those other requirements for high resolution tr-Cryo-EM, such as fast mixing, obtained due to recirculation of the solutes within microscopic droplets, controlled DOD generation, and synchronized plunging, available through the customized plunger module, provide for a unique method and device of the present invention. A detailed description is provided further herein, demonstrating the functionality of each of the components as well as the added value of the integrated system for sampling at millisecond time resolution, as dictated by the desired reaction delay time ($t_d$).

A Microfluidic Chip for Fast Mixing of Solutes and Droplet Generation

The invention provides for a microfluidic chip, exemplified in a specific embodiment shown in FIG. 3. The microfluidic chip as described herein functions to 1) merge two or more aqueous liquid solutions containing protein(s) of interest and/or actuating molecules in a small volume (preferably less than 1 nl, more preferably less than 0.5 nl, or 0.1 nl), and addition of an oil solution via one inlet channel to encapsulate the aqueous solution in droplets, 2) mix the aqueous liquids within the oil-encapsulated droplets within a characteristic time of a few milliseconds or preferably in less than 1 ms, by merging the solutions from the inlet channels in a microchannel and passing them through the serpentine microchannel and, after removal of the oil through the side channel outlets, allow merging of the aqueous droplets, and 3) deliver the mixed solution to the nozzle at the end of the microfluidic chip, where airborne droplets are generated through an electrically-, optically-, or mechanically-controlled actuation mechanism spraying droplets with well-defined controlled size, velocity and timing through the outlet opening, or nozzle tip, as used interchangeably herein.

In one embodiment it may thus be envisaged that the microfluidic chip ((1) in FIG. 1) is composed of at least the following two parts (e.g. as shown in FIG. 3): a mixing module or mixer (FIG. 3A) comprising at least 3 inlet channels configured to add at least two aqueous solutions via at least 2 inlet channels (28) and one oil composition via one inlet channel (29), to obtain merging of the inlet channel solutions in one microchannel (30) resulting in oil-encapsulated aqueous solution droplets (Teh et al., 2008; Tran et al., 2013). Very rapid mixing of aqueous liquids is achieved within each aqueous droplet through recirculation of liquid within the droplets as they pass from the microchannel (30) through a serpentine microchannel (31) (Bringer et al., 2004; Wang et al., 2015) (Qian et al., 2019) (Tung et al., 2009). The serpentine microchannel comprises at least 3 arms (32), or straight channel portions, connected by a bended region (33), typically at an angle of 30-450, or a turn, typically over an angle of 135-150, as to allow efficient mixing (e.g. see Example 1). The second part of the chip (1) concerns a droplet merging module or pillar-induced droplet merger (FIG. 3B), comprising a main microchannel (34) and at least one side channel (35), for extraction of the oil phase from the main channel, allowing to merge aqueous droplets present in the main microchannel (34) into one liquid phase by directing the oil into said side channel (35), which is positioned transversally to the main microchannel (34), and comprises an array of pillars (36) with a flat surface at the intersection of the main micro- and side channel, constructed to extract the oil from the main microchannel. To do so, the row of pillars from the side channel form the wall of the microchannel along its length, or at least along part of its length, wherein said row of pillars have openings at a distance that is smaller the diameter of the droplets (i.e. smaller than the width of the main microchannel) between the pillars to let the oil be extracted into the side channels. The chip in operation with liquids result at a continuous aqueous phase at the end of the main microchannel (34) of the droplet merging module after the oil removal occurred through the side channel. In one embodiment, the microfluidic chip further contains a droplet generation module (FIG. 3C), optionally comprising a further microchannel (37) connected to the main microchannel (34), and comprising one or multiple nozzles (38), fluidly connected to the main microchannel of b., each nozzle comprising a chamber (39) with a flat opening from which airborne droplets fly through the outlet (40) towards the cryo-EM grid upon actuation by the droplet on demand (DOD) actuator. In order to activate droplet spraying, a DOD actuator is required, which may for instance be based on laser-induced-cavitation, as known to the skilled person and as demonstrated herein using an optical module (Zwaan et al., 2007; Dijkink and Ohl, 2008; Park et al., 2011; Tagawa et al., 2012; Patrascioiu et al., 2014; Delrot et al., 2016) (or e.g. US 10,232,368 B2), but may as well be based on alternative droplet actuator mechanisms known in the art, such as a miniaturized piezoelectric transducer (essentially a MEMS—micro-electro-mechanical-system), or a heat-induced actuation similar to for example those described in this patents U.S. Pat. Nos. 7,364,275, 7,445,314, 7,988,247, US6183067, U.S. Pat. Nos. 5,598,196, 6,758,544.

So, the invention provides for a microfluidic chip for rapid mixing of protein solution and generation of air-born droplets from a protein mixture in a controllable manner, comprising: a mixer module (FIG. 3A) for mixing solutions by encapsulating them in oil droplets, said mixer module comprising at least 3 inlet channels, ending in a microchannel for merging the solutes of the inlet channels, forming the oil phase encapsulated droplets of aqueous solutions, and wherein the mixer module ends in a serpentine microchannel, that contains at least 3 arms, sequentially connected by a bended region or turn; followed by a droplet merging module (FIG. 3B) comprising a main microchannel connected to the other end of the serpentine microchannel of the mixing module, and further comprising one or more side channels transversal to the main microchannel, wherein said side channels are configured as transversal outlets from the main microchannel walls, wherein the width of the side channel is at least half of the length of the main microchannel, and wherein said side channel comprises an array of pillars (36), which align the main microchannel wall, and wherein the pillars of an array are distributed evenly over the width of the side channel and separated from each other by a distance (d1) that is smaller than the droplet diameter, or preferably at least two times smaller than the width of the main channel (d2). More specifically, when two side channels are present on opposite sides of the main microchannel walls, both arrays of pillars, which line the wall of the main microchannel by a flat surface, are apart at a distance d2 of at least the width of the main microchannel, the arrays being positioned on each side of the intersection with the main channel, replacing the main microchannel walls; finally the oil extraction chamber is continued by a droplet generation module (FIG. 3C) for continuous spraying of droplets upon actuation, said module comprising a microchannel connected to the end of the main microchannel of the merging module, and with a nozzle, wherein said nozzle comprises a chamber for liquid, preferably rectangularly shaped, ending at the end of the chip in an outlet for the generated droplets, with an opening to the outside of the chip, also called 'nozzle tip'. The modules of the microfluidic chip are composed of a silicone elastomer, and mounted on a flat surface, wherein the microchannels of the chip preferably have a rectangularly-shaped cross-section with an aspect ratio below 2, and a maximum height of 100 μm±10 μm, 80 μm±10 μm, or most preferably 50 μm±10 μm, and wherein the inlet channels of the mixer module are further connectable to a pressure control module configured to control the pressure in each of the at least 3 inlet channels of the mixer module. The 'height' for features of the chip is defined as the distance in the direction perpendicular to the chip surface. The 'width' as defined herein is the distance in the direction of the same plane as the chip surface.

In more detail, the mixer module (FIG. 3A) of the microfluidic chip contains a minimum of three inlet channels (28,29), of which through one inlet channel the oil phase can be injected (29), and through two or more additional inlet channels (28) the aqueous solutions to be mixed may be injected. Said inlet channels may be of any shape, and may of their length change in shape, but typically these inlet channels are wider at the side where the solution comes in, as compared to the width of the microchannels (30, 34, 37) in the mixing, drop merging and nozzle region, as to reduce the total hydraulic resistance of the microfluidic chip. In a specific embodiment, said inlet channels initially have a width of 35-40 μm, and then narrow down towards the end where they merge into the microchannel (30). Within the 'functional' regions of the chip, the microchannels' (30, 34, 37) height is preferably 40-60 μm or smaller with a rectangular-shaped cross section with an aspect ratio of preferably below 2. The 'aspect ratio' is defined as the ratio of the height over the width.

So, in the mixer module (FIG. 3A) the aqueous droplets encapsulated in the oil continuous phase are formed, when the three liquids come in contact with each other in the first microchannel (3), at which point the aqueous solutions are confined in the oil phase, and the size of the aqueous droplets is defined by the ratio of the flow rates of oil phase in the inlet channel (29) and the aqueous phases in its inlet channels (28). Next, the serpentine mixer is made of three or more sections each of which has an arm (32), which is constituted by a straight microchannel with a length of at least twice the microchannel width or longer, which is joined with the next arm by a turn or bending region, preferably at an angle in the range 30-450. Mixing of aqueous solutions within the droplets is accelerated by the liquid recirculation in a droplet passing through the serpentine microchannel (31) where at each bending (33) of the channel, asymmetric circulation is introduced, by reorienting direction of recirculation within the droplet. This creates a 'complex' pattern of sandwiched thin liquid lamellas within which the mixing is accomplished by diffusion.

Second, the droplet merger separates the oil and aqueous phases to avoid the presence of oil in the nozzle (38) and on the EM grids. The drop merger module (FIG. 3B), following the droplet mixing module, has a main microchannel (34) length preferably in the order of 200 μm (or longer), which is the shortest length enabling reliable droplet merging using the system described herein, since reliable merging is defined further by the size of the droplets and the gap width or distance (d1) between the pillars within the array, as to obtain optimal oil extraction via the side channels (35). Due to the surface tension in the solution present in the main microchannel, aqueous droplets are retained in the main microchannel while the oil is extracted through the side channel, thereby inducing merging of the aqueous droplets (Xu et al., 2011; Haliburton et al., 2017). The design of the extracting side channel(s) is such that hydraulic resistance of the comb or array of pillars (36) for the aqueous phase or droplets is higher than hydraulic resistance of the water channel (34) to prevent leakage of the aqueous phase from the main microchannel (34) into the side 'waste' channel(s) (35).

So the oil removal device, or droplet merging chamber, based on pillar-induced droplet merging, as defined herein, and as also described in DeMello et al. (GB2474228A), relates to a droplet merging module with at least one side channel (35) as oil outlet from the main microchannel (34), wherein said side channel (35) is transversely intersecting the main microchannel (34), and comprises an array of pillars (36), wherein said pillars comprise a flat surface that is substantially in line with the wall of the main microchannel, at a distance (d2) of the opposite wall of the main microchannel, wherein d2 is substantially identical to the width of the main microchannel (34), and the pillars extending inside the side channel (35), each separated from each other at a distance (d1), which is smaller than the droplet diameter, or is at least 2 times smaller than the width of the main microchannel (34) (d2); or alternatively is described herein as at least one side channel (35) as outlet from the main microchannel (34) walls, with a width of at least half of the length of the main microchannel (34), and wherein said side channel (35) is transversely intersecting the main microchannel (34) and comprises an array of pillars (36), wherein said array of pillars comprise a flat surface that is substantially in line with the wall of the main microchannel, and extending inside the side channel (35), and wherein the pillars are each separated from each other at a distance (d1) which is smaller than the droplet dimension, or is at least 2 times smaller than the width of the main microchannel (34). With 'transversal' side channel is meant herein that the side channel is directed into a different direction than the direction of the main microchannel, and intersects over its width with the wall of the main microchannel. The intersection may form perpendicularly oriented main and side channel, as shown in FIG. 3, or may form an angle between the wall of the side and main microchannel between 50 and 1750, or between 250 and 1500, or between 500 and 1200, or between 750 and 950.

In one embodiment, two side channels are present in the chip on opposite sides of the main microchannel, each having a row or array of pillars, said arrays being separated at a distance (d2) which is the same or larger than the diameter or cross-section width of the main microchannel, and within such an array of pillars, the pillars being separated at a distance d1 which is smaller than the droplet dimension, so that removal of oil through the gaps between the pillars allows one or more droplets to merge into one larger droplet. The droplet dimension is ideally as close as possible to the diameter or cross-section width/height of the main microchannel. The oil removal is achieved by the distance between adjacent pillar elements and the distance between pillar elements and adjacent channel walls being of such a size that that the aqueous droplets are not able to pass through the pillar elements into the oil outlet channel. The total size of the opening (i.e. the distances between the pillar elements and/or between pillar elements and the channel walls) must be sufficiently large to enable all oil to pass into the oil outlet channel. The combination of oil having a lower surface tension than water, the channel surfaces being lipophilic, and the size of the aqueous droplets, means that the oil is able to pass through in between the pillars into the oil outlet channel, whereas the aqueous droplets are not. This results in droplets merging into the aqueous flow in the main microchannel, determined by the size of the aqueous droplets, the small gaps between the pillars, and the hydrophobicity of the channel walls and the pillars, allowing the aqueous sample droplets flow past the opening of the oil outlet channel. Thereby, the oil flows into the oil outlet channel and the aqueous solution is injected into the aqueous flow channel and carried to the droplet generation module of the chip.

In said embodiment with two side outlet channels in the droplet merger module, each side of the droplet merger main microchannel (34) is thus lined with a row of pillars (36), preferably more or less evenly distributed, to extend into two side channels opposite to each other and transversal, or ideally perpendicular to the direction of the wall of the main microchannel (34). The distance (d1) between pillars is smaller than the droplet dimension, or preferably at least two times smaller than the width of the main channel (34) and preferably at least three times smaller than the pillars' flat surface width. The distance between the two arrays of pillars (d2), or else the main channel (34), is at least equal to the width of the serpentine microchannel (31). In a specific embodiment, each array contains 5 or more pillars (36) which are each 30 μm wide separated by distance (d1) of 15 μm. In a specific embodiment, the distance between two arrays of pillars (d2) is 55 μm, which is 5 μm wider than the width of the main microchannel (34) (which is a continuation of the serpentine channel its width (31)), being 50 μm in this particular embodiment. The number of pillars and the distance (d1) between the pillars define the hydraulic resistance for the oil and the value of the negative pressure that may need to be applied to the waste channels (35) for efficient oil extraction. This configuration of oil extraction side channels is based on a previously published scheme for pillar-induced droplet merging (Niu et al., 2008), which consists of two channels separated from the main microchannel by an array of pillars, in a perpendicular direction as compared to the flow in the main microchannel, and each side channel on opposite sides of the main microchannel.

As shown herein, the two side channels (35) each comprising an array of pillars are wider than the width of the main microchannel (34), preferably as wide as the total length of the main microchannel of the droplet merging module, and positioned on opposite sides of the main microchannel (FIG. 3B). The width of the side channels may increase when extending further from the main microchannel. The array of pillars (36) comprises a number of pillars which are blocks in the same material as the chip microchannels and which may be rectangular shaped, with a flat surface lining or replacing the wall of the main microchannel. One or more pillars are thus located in the opening of the oil outlet channel, and each pillar should comprise a flat surface that is substantially in line with the wall of the main microchannel adjacent to the opening of the oil outlet channel. The rest of the pillar is located inside the oil outlet channel. The array may comprise 1, 2, 3, 4, 5, 6, 7, 8, 9, or 1 pillars, for example 1, 2, 3 or 4 pillars. Each pillar has an aspect ratio, defined as the height divided by width or length (whichever is smaller), preferably not higher than 2 (when manufactured in PDMS, other materials may allow for higher aspect ratios). The pillars may be identical in width and shape, but may be of different lengths, being spread more or less equally over the width of the side channel, and at the same intersection area with the main microchannel (34), i.e. at the same distance d2 from the opposite array of pillars in the side channel of on the other side of the main microchannel. The number of pillars depends on the width of the side channel (35) at the intersection distance d2 with the main microchannel (34) and from the width of a single pillar, wherein the array should contain the number of pillars that is capable to cover the complete width of the side channel intersection with the main microchannel with a space or distance d1, being at least half of the width of the main microchannel, between the pillars of the same array.

In an alternative embodiment, the oil extraction in the side channels can be enhanced by introducing a negative pressure via an optional pressure control module (4) present in the integrated device, and connected via a tubing (3*b*) to said side channels, and controlled by a PC. In this particular set-up (as shown also in FIG. 1), three pressure controllers are used to regulate the fluid flow in the chip by setting the pressure/flow rate applied to the inlet channels, and a fourth pressure control module is used to improve oil extraction by applying a negative pressure on the tubing connected to the side channel of the chip. This results in droplets coalescence in the droplet merging module of the chip. In this case the pressure controller module applies a negative pressure to the oil extraction channels (for instance by applying a system as provided by the LINEUP PUSH-PULL, P/N: ELUPPU1000, FLUIGENT Smart Microfluidics). The pressure values are typically in a range of minus 10 to minus 50 mbar depending on the flow rate of the aqueous phase.

Thirdly, the droplet generation module (FIG. 3C) in more detail comprises a single or multiple nozzle(s) (38), which is fluidly connected on the one end to the main microchannel (34) of the droplet merging module, optionally via a microchannel (37), and the nozzle on the other end having an outlet opening (40) or nozzle tip, for ejecting the droplets outside of the chip. The droplet generation module separates the mixed aqueous solution into droplets upon (external) actuation and sprays droplets from the outlet opening or tip of the nozzle(s) located on the outside of the chip (40). The DOD droplet actuator module is applied to induce droplet formation, and may for instance be an optical module with a laser containing in the laser path an additional diffractive optical element as to split a single laser beam into a defined number of beams, corresponding to the number of nozzles/chambers present in the device. In the simplest embodiment with a single nozzle, no microchannel (37) is required, and the nozzle (38) consists of a single chamber (39), which may for instance be about 50 μm in width and a height varying in a range between 35 and 60 μm. The nozzle outlet or nozzle tip (40) opens to the outside of the chip such that both surfaces composing the chip, the part embedding the channels and the flat surface material that seals the channel from the other side, are aligned to each other with accuracy of a few μm and have walls perpendicular to the channel plane, as to form a flat exterior surface. The size and geometry of the nozzle outlet (40) can vary. In another embodiment, the droplet generation module (FIG. 3C) may comprise multiple nozzles (38) resulting in multiple outlets (40) to multiply the number of generated droplets and increase coverage of the EM grid with protein sample-containing droplets. The design of the nozzle may be similar or the same as for a single nozzle, but when multiple nozzles are present, the main microchannel (34) of the droplet merging module is fluidly connected to a further microchannel (37), which connects the different nozzle chambers, as exemplified in FIG. 3. The microchannel (37) of said droplet merging module is preferably present only when multiple nozzles are envisaged and is preferably as short as possible in length. The outlet openings each terminate as a nozzle tip at the outside of the chip, and are separated from each other by thin walls (41). In a specific embodiment, two to five outlets of each 20-40 μm wide openings are separated by thin walls of about 15-30 μm thick.

Finally, the microfluidic chip may be fabricated using a standard soft lithography technique, as known in the art, and whereby the different chip modules are interconnectably composed of silicone elastomer, which is sealed on a flat surface. In a specific embodiment, the microfluidic chip is made using a silicone elastomer (such as polydimethylsiloxane (PDMS)) bonded to a glass slide. However, the chip can also be fabricated in other materials, including but not limited to thermoplastic polymers through injection molding or hot embossing fabrication processes, or glass or a combination of silicone and glass, or quartz. At least, the channel surfaces require a hydrophobic nature, as to ensure optimal wettability of the polymeric channel walls with the oil phase when flowing through the channel. To obtain the required hydrophobicity for the PDMS material, the module is kept on a hot-plate at 180° C. for 4 hours. In a specific embodiment, where laser-induced cavitation is applied as actuation mechanism, the chip surface material comprises an optically transparent flat surface material, such as glass. In a further specific embodiment, said glass has a thickness of maximally 250 μm to allow the laser beam reaching the focus point in the chip. In an alternative embodiment, when piezoelectric actuation is desired, the chip is made of at least two materials whereby the piezoelectric actuation is obtained by a specifically designed miniature actuator therein, such as for instance piezoelectric ceramic, as known by the skilled person.

In a specific embodiment, the manufacturing of a PDMS-glass chip involves cutting the PDMS chip transversal to the channel to make the nozzle outlet opening. After, the polymer device is sealed with a glass slide, by carefully aligning the two parts to obtain a sharp rectangular opening in the chip. In a preferred embodiment, showing the best reproducibility of the chip fabrication and alignment of the laser focus to the nozzle, a thin glass slide, with a thickness 25 um or less, was used to seal the PDMS chip. This significantly simplifies the accurate alignment (offset between aligned surfaces is below 5 μm) of the glass slide to nozzle channel outlet opening embedded in the PDMS part. So the outlet opening is made by cutting off the chip material and surface material in the same plane, transversal to the channel direction, and preferentially perpendicular to the channel direction. The fabrication to obtain a flat nozzle outlet opening at the nozzle tip is critical for reliable generation of the air-borne droplets.

Operating the microfluidic chip to generate aqueous droplets of mixed solutes.

Another aspect of the invention relates to the method to operate the microfluidic chip by adding fluids in the inlet channels (28, 29), whereby the flow of the liquid solutions in the chip is controlled for its pressure with an external pumping system operating manually, for instance by using a syringe pump, or preferably through an automated pressure controlling module (such as a Fluigent) (scheme of set-up in FIG. 1A, (2-4)). The pressure control module as demonstrated herein provides for sample reservoirs (3) pressurized with air in order to control the pressure drop between each of the inlets (28, 29) and the outlets (40) of the microfluidic system. The flow rate depends on the applied pressure and the hydraulic resistance of the microfluidic chip device, which varies between different chips, depending on the size and material of the channels and the chip, and the number of inlet channels. In order to control the flow rate and maintain stable constant flow rates, as well as for better reproducibility of the results generated using different microfluidic chips (slight difference in hydraulic resistance in different chips is likely), each pressure controller is coupled to a flow meter (2) through a feedback loop. For controlling the pressure when operating the integrated device or the microfluidic chip as used herein, each of the at least three inlet channels (28, 29) is connected to a reservoir (3), which may be a 1.5 mL eppendorf tube or any other reservoir suitable for the solution of interest, comprising the solutions for each inlet channel, further connected to the inlet channel via a flow meter using for instance PTFE tubing.

The operation of the device using a pressure control module connected to the inlet channels of the chip allows to vary the applied pressure via the pressure controllers (4), which may be computer-controlled by the microprocessor-based control unit as driven by a computer (PC), and with a pressure <1 bar, preferably below 500 mbar, most preferably between 5 and 22 mbar, as to result in corresponding flow rates of the solutions in said inlet channels between 1 and 100 μL/min, or preferably between 2 and 60 μL/min, more preferably between 2 and 10 μL/min, depending on the pressure as well as on the chip geometry and reaction delay time. A single pressure controller (4) is connected to each one of the inlet channels (dedicated to oil and aqueous phases). The flow in the microfluidic chip is started by first setting the pressure values for each channel and then synchronously initiating the flow using custom written LabVIew software.

In a specific embodiment, an at least fourth pressure control module is present in the pressure controller (4), which is connected to the chip side channel's (35) entrance by tube (3*b*), as to apply a negative pressure, controlled by the control unit, when oil needs to be extracted from the chip channel.

The plunger module for positioning the droplet recipient and plunge-freezing of the sample.

The plunger arm module (FIG. 1B) contains a plunger arm (FIGS. 1 and 2 item (5)) rotating around a horizontal axis. A grid clip mechanism (6) enables fixing a droplet recipient, such as an EM grid, which is composed of at least one small and light clip (for instance made of stainless-steel vessel clip, with a clamping pressure of 60 g, as provided by AgnTho's Micro Serrefine Clamp), and is attached on one end of the arm (5). On the other end of the arm, an electrical coil (7) is attached, which is part of the rotational voice coil with stationary permanent magnets (8) (e.g. as described for a hard drive in U.S. Pat. No. 7,576,954B2 or JP2007115391A). The position of the arm (5) is monitored by an optical rotary incremental encoder (made up of 9 & 10) (e.g. HEDS-51X0/61X0, Avago) in which a rotating code wheel (9) is co-axial with the rotation axis of the plunger arm while the detector (10) is stationary and mounted on the housing of the arm (43). The positional information of the arm, obtained from the encoder, is used to control the arm movement during the plunging process by a dedicated microcontroller unit (11). The microcontroller unit applies a voltage over a defined period of time and in the desired direction to the voice coil, based on the settings of a specific program being executed (as for instance controlled and driven by the microprocessor-based controller unit (42) of the integrated apparatus, see below). Electrical current flowing through the coil in one direction induces clockwise rotation of the arm, and anticlockwise when the direction is reversed. The customized plunger arm setup as provided herein allows for controlled movement of the grid held by the grid clip mechanism, and, due to low weight of the rotating arm, and due to the voice coil enabling the application of a high constant torque, resulting in very high acceleration of the arm, and very fast plunging times can be achieved. These advantages of this customized plunger module are obtained even in such a very compact setup, wherein the arm movement is limited to a few centimeters so it can fit under an optical microscope with a focal distance of its objective in a few centimeters (FIGS. 1 and 2).

So this aspect of the invention provides for a plunger module for controlled movement of a grid between the nozzle tip and cryogen for plunge-freezing of the time-resolved sample comprising:

a. a plunger arm (5), which is rotatable around a horizontal axis, which further contains:
   i. a grid clip mechanism (6) attached on one end of the arm for fixing a grid,
   ii. a rotational voice coil (7) attached on the other end of the arm,
   iii. an optical encoder comprising a rotatable code wheel (9) and a detector (10) for monitoring of the angular position of the plunger arm, which is positioned at the rotation point of the plunger arm,
b. a microcontroller unit (11), for controlling the current through the coil which allows to move the arm in both directions (up and down), and wherein said microcontroller unit may be programmed to execute a different time regime of arm movement corresponding to particular plunging times for different reaction delay time regimes, wherein the grid clip mechanism is configured to hold a grid in vertical position for arm movements at velocities that may go over 30 m/s, and built so that the arm and microcontroller are connected to a housing or mounting post (43), which may be mounted on a solid structure (25, 23).

The integrated apparatus for time-resolved sample preparation of a sample.

A further aspect of the invention relates to an integrated apparatus or device including the previously aspects, the customized microfluidic chip and plunger module, as part of the solution for improved sample preparation in time-resolved cryo-EM analysis of protein structures, allowing to prepare EM-grids with vitrified protein sample, wherein the proteins were mixed in milliseconds, and processed at high speed, within a millisecond sampling time resolution, and requiring only picoliter to nanoliter protein amounts.

The integrated apparatus as described herein comprises the microfluidic chip as described herein connected to a pressure module, as known in the art and/or as described and/or exemplified herein, a plunger module as described herein, and further comprises a droplet actuation module for controlled droplet on demand ejection of drops from the nozzle to the grid, as known in the art and/or as described and/or exemplified herein, and a microprocessor-based controller unit (42) (see FIG. 4) for synchronizing and controlling movement of the plunger arm, the pressure control unit and the thermostat of the reservoir of a cryogenic module as known in the art and described herein. The integrated apparatus and its components are configured to function in time-resolved sampling and vitrification as exemplified herein and as for instance (but not limited to) the setup shown in FIGS. 1 to 4.

More specifically, one embodiment relates to the integrated apparatus wherein the microfluidic chip (1) is mounted on a solid structure, such as a X-Y-Z stage (24*b*) which is positioned on a holder or housing (24), on its turn mounted on another solid structure, such as a mechanical X-Y stage (23). If motorized, said X-Y stage should preferably have an accuracy below 1 mm, and preferably also has the plunger module and cryogenic module of the integrated apparatus mounted on it. Said setup is configured to relatively position the plunger module to allow plunger arm (5) movement parallel to the plane of the nozzle outlet of the chip (1), and the position of the grid clip mechanism (6) for holding a grid with its grid surface parallel to the surface of the nozzle outlet(s) (40) at a distance below 1 mm, which is a distance suitable for receiving droplets from the nozzle tip.

Droplet on Demand (DOD) Actuation Module.

To obtain spraying of airborne microdroplets droplets on demand from the microfluidic chip (1) upon actuation in the nozzle and ejected from the nozzle tip (40), a DOD droplet actuation module is required to mediate and control the DOD process. The droplet actuation may be mediated by different approaches as to generate DOD, such as for instance, but not limited to, actuation means known in the art as piezo-electric actuation, which is well established and characterized for inkjet printers in particular of mark EPSON (U.S. Pat. No. 7,445,314 B2), or alternatively, laser-induced cavitation. While the first one is the mostly preferred in commercialized devices, as it is cheaper and easier to manage droplet generation, the fabrication of the device is more difficult. So, therefore the proof of concept prototype of the integrated device that was build and developed on laboratory scale as described herein, has made use of an optical module for laser-induced cavitation, which is compatible with simple chip fabrication strategies. However, the integrated device described herein, in particular the microfluidic chip, allows integration of an actuation module of the piezo-electric type as well, because the geometry requirements for both actuation mechanisms are very similar, since actuation is very local, and it is applied to a small compartment of the chip with a volume of few hundred picoliters (in the chamber of the nozzle).

To generate droplets at the nozzle tip (40) via laser-induced cavitation, it is important to focus the laser near the wall at the nozzle (38) through the flat surface, such as the glass slide. The laser power used to produce droplets for the tr-Cryo-EM that is needed to induce droplet ejection (e.g. a 4-6 μJ/pulse) can damage the material of the chip, e.g. the PDMS, and consequently deteriorate its optical properties required for precise focusing the laser beam. In a specific embodiment as provided herein, the optimal conditions for droplet generation require the laser being focused at a distance from the nozzle tip (40) defined by the channel cross-section and maximum laser power intensity usable to induce the cavitation effect without damaging the device. With the laser focused at a distance larger than the optimal one, the laser-induced cavitation does not induce fast-enough motion of the meniscus at the nozzle to eject a droplet of liquid. The accurate control of laser intensity is also critical, and known how to determine by the skilled person. Laser flashes of higher energy ablate the glass surface deteriorating optical properties of the glass and reducing cavitation effect.

In the actuation module setup as described herein, cavitation is generated using a focused laser beam from the second harmonic of a pulsed NdYAG laser (wavelength of 532 nm and pulse duration 6 nm). The laser beam is focused near the microchannel wall at the defined optimal distance from the nozzle tip (40) in case of a single nozzle being present in the droplet generation module. For a multiple nozzle configuration, the laser beam is split into beams of equal intensity propagating at defined equispaced angles to obtain a linear array diffraction spots in the focal plane of the objective lens, to arrive at the point where the microchannel (37) and the chamber (39) intersect for each of the nozzles present in said multiple nozzle configuration. The operation principle of laser-induced cavitation is to have the laser light absorbed by the target media (i.e. the aqueous solution), which in the focal point results in heating of the liquid that induces boiling and thereby producing a short-lived air bubble within the channel or chamber, where the air bubble grows and then collapses with a lifetime of a few microseconds. This collapse induces a jetting from the nozzle that produce airborne droplets from the nozzle tip.

In the exemplified integrated device as shown herein in FIGS. 1-4, DOD ejections are created by laser-induced cavitation, requiring an actuation module comprising a laser (17), in a particular embodiment this may be a Q-switched NdYAG laser (AO-L-532, CNI Optoelectronics Tech. Co., Ltd.), which is coupled to an optical module, said optical module being meant to control and monitor the positioning of the laser to the nozzle of the microfluidic chip. In a particular embodiment, said optical module is composed of a focusing objective lens (18), in particular this may envisage a 5× objective LMH-5X-532 Thorlabs objective, which is mounted on an optical microscope (19), such as for instance, a Cerna Mini Microscope, Thorlabs Inc. Furthermore, the optical module may comprise a (high-speed) camera (20) such as for instance a Phantom VEO410 L camera, which may be mounted on the microscope as to allow recording fast processes taking place on the microfluidic chip (1) and to monitor and control production and deposition of droplets on the EM grid during plunging. The laser beam is expanded with a 10× beam expander (21) (e.g. BE10-532 10X, Thorlabs Inc.) and directed with mirrors to the microscope through a side entry port where it is brought onto the optical axis of the objective lens (18) by a beam splitter (22) (e.g. BSW4R-532, Thorlabs Inc). The laser beam intensity is continuously monitored using a power meter (26) and the laser beam can be blanked by a fast, automated shutter or aperture (27).

So in a specific embodiment, the integrated apparatus as described herein comprises a droplet actuation module for laser-induced cavitation, said droplet actuation module comprising:

a. a pulsed laser (17), preferably with an automated aperture (27) and power meter (26), and b. an optical module for focusing the laser on the nozzle, wherein the pulsed laser is focused on the microchannel (37) of the nozzle (38) of the microfluidic chip (1) at a focusing point suitable for droplet generation, preferably at 25-50 μm from the nozzle tip (40).

To start operating the droplet actuation module for laser-induced cavitation as described herein, the (NdYAG) laser (17) is warmed up and its energy, as detected by the power meter (26), is adjusted to 10-12 ρJ per pulse*per nozzle. This corresponds to the laser power per focal point of around 4-6 ρJ on the microfluidic chip (1) surface, which is the power needed to induce the cavitation. The laser as described and used herein operates at the frequency between 1 and 5 kHz.

In a specific embodiment, said optical module, may thus comprise an objective lens (18) for focusing the laser beam on the nozzle of the chip (1), whereby the chip is aligned using an XY stage (24) and the objective lens (18) can be moved in Z direction for laser focusing, and (optionally) further comprises optical elements including a beam expander (21), a prism, mirrors and beam splitter (22) to bring the laser beam on the optical axis of the objective lens (18), an optical microscope (19) and/or a fast video recorder or camera (2) for recording droplet mixing, merging and spraying on the moving EM grid.

The Cryogenic Module

A cryogenic module, used for instance for time-resolved cryo-EM, serves for rapid cooling of the sample on for instance the cryo-EM grid as to enable vitrification of the proteins. A cryogenic module as described herein contains at least a (compact custom-built) cryogenic container for liquid nitrogen (FIG. 1, (12)) comprising a reservoir for liquid ethane (13). The reservoir in the container may be thermostated at a selected temperature above the freezing temperature of the cryogen, e.g. for ethane usually 92K, using a heater and thermocouple-based thermometer. In a specific embodiment (FIG. 1A), the liquid nitrogen container (12) may further comprise a holder (14) for a cryo-EM grid box permitting transfer of the multiple samples to the EM grid storage box.

The term 'cryogenic storage dewar', 'cryogenic container' or 'dewar' as used herein, refers to a type of storage container suitable for storing cryogens (such as liquid nitrogen or liquid helium), whose boiling points are much lower than room temperature. Cryogenic storage dewars may be a specialised type of vacuum flask, or may take several different forms including open buckets, flasks with loose-fitting stoppers and self-pressurising tanks. Dewars typically have walls constructed from two or more layers, with a high vacuum maintained between the layers. This provides very good thermal insulation between the interior and exterior of the dewar, which reduces the rate at which the contents boil away. Precautions are taken in the design of dewars to safely manage the gas which is released as the liquid slowly boils. The simplest cryogenic containers allow the gas to escape either through an open top or past a loose-fitting stopper to prevent the risk of explosion. More sophisticated cryogenic containers trap the gas above the liquid, and hold it at high pressure. This increases the boiling point of the liquid, allowing it to be stored for extended periods.

In order to minimize transfer time of the grid between nozzle tip (40) and cryogen liquid (in reservoir 13), the microfluidic chip (1) needs to be placed as close to the surface of the ethane as possible (FIG. 1A). A specially adapted lid (15) may be placed on top of the cryogenic container (12) to minimize flow of cold gas above the surface of cryogen/ethane while avoiding contamination of cryogen/ethane with moisture absorbed from the ambient air. In a specific embodiment, automation of the integrated apparatus for the grid handling to picking up a grid from dedicated positions, plunging it into liquid ethane and transferring the grid to a grid box (14) may be obtained by motorization of the grid clamp or grid clip mechanism (6), as used interchangeably herein, and the cryogenic container (12).

In a specific embodiment, the integrated apparatus as described herein comprises a cryogenic module which comprises a cryogenic container for liquid nitrogen (12), wherein said container is configured to allow a minimal flow of cold gas above the lid (15) surface, holding a reservoir (13) for liquid ethane, optionally thermostated, and optionally a holder for a grid box (14).

For longer reaction delay times (see below), the plunger arm may need to be parked in a waiting position for a few seconds in time, this period though requires additional measures to avoid evaporation of microdroplets with protein on the EM grid. The reduction of the evaporation rate may for instance be achieved by constructing a miniaturized environmental chamber, as known by the skilled person, creating local high humidity around the grid.

Assembly and Operation of the Integrated Apparatus for Tr-Cryo-EM Sample Preparation, Using Laser-Induced Cavitation.

In order to assemble a functional integrated apparatus as described and exemplified herein, the following points need to be taken into account:

- The microfluidic chip (1) is connected to flow and pressure controllers and is mounted on a designated holder (24) attached to a manual XYZ stage (**24*b***) solid support, enabling alignment of the chip relative to the other components of the setup.
- The microfluidic chip on said solid support, the plunger arm module and cryogenic module may be mounted on a single solid support, preferably a motorized XY stage (23).
- The plunger arm (5) on a mounting post (43) is mounted on a mechanical XY stage (25) and aligned such that the arm moves in the same plane as the plane of the nozzle and the surface of the mounted grid is parallel to the nozzle plane (FIG. 2). The position of the grid clamp is aligned such that the distance between the EM grid held by the grid clamp and the nozzle outlet (40) of the microfluidics chip is below 1 mm.
- The liquid nitrogen container (12) of the cryogenic module is placed on a motorized XY stage (23) with the center of the reservoir for ethane (13) aligned with the tip of the grid clamp (6) of the plunger module.
  - The cryogenic container (12) needs to be cooled down and filled up with liquid nitrogen and liquid ethane is condensed in the corresponding reservoir (13) after which it is thermostated at 92 K.
- In the optical module:
  - the objective lens (18) can be moved in Z direction to focus the laser beam on the nozzle of the chip (1), and the laser beam has to be aligned using mirrors on kinematic mounts such that the beam is parallel to the optical axis of the objective lens (18),
  - Using the stage and focus of the microscope (19) that displaces the objective (18) along the vertical Z axis, the laser is focused on the nozzle (38) of the microfluidics chip (1).

So in a specific embodiment, the integrated apparatus is configured to have the microfluidic chip (1) mounted on a XYZ (**24*b*) stage which is on a solid structure holder (24) positioned on a motorized XY stage (23), which also has the plunger module and cryogenic module mounted on it, configured to relatively position the plunger module to allow plunger arm (5) movement parallel to the plane of the nozzle outlet of the chip (1), and the position of the grid clip mechanism (6) for holding a grid with its grid surface parallel to the surface of the nozzle outlet(s) (40**) at a distance below 1 mm, for receiving the droplets from the nozzle tip on the grid held by the grid clip mechanism of the plunger arm, allowing fast plunge-freezing by movement of said plunger arm.

Using the optical module, the skilled person can focus the laser beam on the nozzle, preferably at a distance of 25-50 μm from the nozzle tip when the microfluidic chip is in use, and so continuously flowing aqueous solution/droplets containing the dye, as described above, to produce and spray droplets in a controlled and stable fashion. Following the alignment of the laser beam, the tubings of the pressure module connecting to the inlet channels (28) of the microfluidic chip are placed in their aqueous solutions and primed together with the chip with the aqueous protein solution and solution of actuating molecule. However, this set-up configuration, and therefore, the usage of an external pumping method to control the fluid flow, generates dead-volume and a consumption of protein sample needed to prime the system and verify laser alignment. Part of the dead volume is due to the tubing to interface the chip with the pressure controller module. Each tubing connecting to the inlet channels has typically a length of ≈20 cm and an internal diameter of 0.18 mm, corresponding to a volume of approx. 5 μL. The volume of the inlet channels for the aqueous phases (28) is approx. 0.125±0.05 μL. In addition, the volume of the channels within the chip being filled with aqueous solution following the water in oil droplets formation point needs to be taken into account as well, and equals the surface area comprising the serpentine channel (31), the main microchannel (34) and the microchannel of the nozzle (37), multiplied by the channel height. In a specific embodiment of the exemplified chip, the aforesaid surface area is 700 $\mu m^2$, and the channel height is 50±10 μm, so a total volume in a range of 2±0.5 nL. Therefore, the total dead volume of aqueous protein solution needed to prime the device as described herein is still below 6 μL and can even be reduced several folds by changing inner diameter and length of the tubings.

Part of the sample volume will thus be consumed during the priming of the system and laser alignment. This usually takes between 30 s-120 s, and the amount of sample consumed for priming will as well depend on the applied pressure or else the aqueous phase flow rate. Experimental data showed that applying a pressure to the oil and aqueous phase in a range 50–200 mbar, with the ratio between oil/aqueous pressure in the range 1-1.2, the flow rate is in the range 4-40 μL/min. To reduce the sample consumption the alignment phase is performed at the lowest possible flow rate, that is 5±1 μL/min, which allows for a process consuming a protein volume in a range 2.5-10 μL. Preferably, as to reduce protein consumption, alignment can be performed with a buffer solution not containing protein.

Furthermore, to prepare an EM grid with protein sample for time-resolved cryo-EM, a plasma cleaned EM grid is mounted on the clamp of the plunger arm placed in park position (FIG. 5) and the sample preparation is triggered by the arm controller. The movement of the plunger arm carrying the grid towards the cryogen is initiated and while the grid passes in front of the nozzle it receives the droplets on its surface (during the time the grid passes in front of the nozzle multiple droplets are being ejected as generated by the droplet actuation module). The flows of oil composition and aqueous solutions to be mixed and dispensed are induced only over a short period of time needed to get stable droplet generation (1 s or less) and are synchronized with movement of the plunger arm as described below thus limiting sample consumption.

Finally, in order to operate the integrated apparatus as described herein in an automated manner, a computer connected to the microprocessor-based controller (42) as well as an electrical connection to the other components of the setup as indicated in FIG. 4 are required. For a description of the requirement on synchronizing and controlling the integrated apparatus and its components, see below.

The setup as shown in FIG. 1-4, applying 3 reservoirs connected to an inlet channel, one filled with an oil composition, one with an aqueous solution containing protein of interest, and one with an aqueous solution containing an actuating molecule and/or another protein, has been tested and confirmed to allow stable and controlled generation of droplets, vitrification of the proteins within the samples and high resolution cryo-EM analysis.

Synchronization and Control of the Operation of the Integrated Apparatus for Time-Resolved Sample Preparation Via the Microprocessor-Based Controller Unit.

As shown in FIG. 4A, the microprocessor-based controller unit (42), operated by a computer, preferably programmed, allows to synchronize and control the activities of the different components during sample preparation, and selecting specific reaction delay times in milliseconds range. Defined by the plunging time that is set for the arm microcontroller (11), the microcontroller selects automatically the plunging regime (fast, middle, long) of the plunger arm module.

To initiate sample preparation on a grid placed in the plunger arm grid clip mechanism, first pressure is applied on the inlet channels using the pressure controllers of the pressure control module. The aperture or shutter (27) of the (warmed up) pulsed-laser is opened synchronously or after a specified reaction delay time, with an opening time of less than 10 ms, allowing to initiate laser-induced cavitation in the nozzle of the chip for forming droplets to be sprayed on the grid. After the flow in the chip is stabilized, which requires a time of 1 s or less, the arm movement is actuated via the arm microcontroller (11), so as to deposit droplets on the grid and plunge the grid into the (thermostated) cryogenic module. After the droplets have been deposited on the EM grid, the pressure at the inlets is dropped and the laser aperture is closed to stop the sampling. The time required for completing a grid may be around 1 s during which pressure is set on the inlet channels, and may even be reduced to 100 ms or even lower if sample consumption needs to be minimal.

FIG. 4B shows the synchronization that is required and mediated by the microprocessor-based controller unit (42) in a I) fast plunging regime (for short reaction delay time) and intermediate plunging regime (for medium reaction delay time) mode, or II) slow plunging time (for long reaction delay time) mode.

The Reaction Delay Time and the Corresponding Control by the Microprocessor-Based Unit and Plunger Arm Movement.

The reaction delay time, $t_d$, is the time needed for sampling on a grid, or the time between initiation of the reaction by mixing and grid plunge-freezing, and defined herein as the sum of three time components:

$$t_d = t_{chip} + t_{fly} + t_{plunger} \tag{1}$$

wherein $t_{chip}$ is the residence time of liquids in the chip, the time between the moment when the droplet formation begins, i.e. the junction in the microchannel (30) at which the aqueous solution(s) of the inlet channels (28) and the continuous phase of the oil inlet channel (29) come together, until the moment that an airborne droplet is generated; and $t_{fly}$ is the time of flight of the droplet between nozzle tip and the grid surface (typically $t_{fly}$<1 ms); and $t_{plunger}$ is the time needed for the plunger arm to move the EM grid held by the grid-clip mechanism from the position opposite to the nozzle tip of the microfluidic chip (the moment when microdroplets are deposited on the grid) to the ethane reservoir of the cryogenic module.

The grid should enter the ethane in the reservoir with a velocity exceeding a certain minimal speed (speed in order of 1 m/s) for vitreous ice to form.

The number of droplets (N) deposited on one EM grid while it is moving in front of the nozzle tip as held by the plunger arm is:

$$N = t_{grid} * f_{laser} \tag{2}$$

wherein $t_{grid}$ is time required for the grid to pass in front of the nozzles, which is calculated as the diameter of the grid observable under transmission electron microscope $D_{grid}$ (typically around 2 mm) divided by the average velocity of the grid during the time span the observable area of the EM grid spends in front of the nozzle $V_{grid}(D_{grid}/V_{grid})$; and wherein $f_{laser}$ is the laser frequency (typically between 1 and 5 kHz).

The reaction delay time, determining the time resolution for tr-Cryo-EM using the integrated apparatus presented herein, is adaptable and controlled through: first, a tunable plunging time, $t_{plunger}$, of the plunger arm which is able to control the delay between the moment droplets are deposited on the grid and moment the grid enters into liquid ethane vial; and second, by adjusting pressure applied to microfluidic chip to flow liquids with different velocities and therefore to control $t_{chip}$ and at the same time sample consumption.

The sample consumption per plunged EM grid in the presented design of the microfluidic chip is determined by the flow rate of aqueous solutions and time during which the flow is applied. This may be controlled by a software interface, as described further herein.

We have determined that to stabilize the flow and droplet generation the time needs to be 1 s or lower. The flow rate of the aqueous phase depends on the desired time resolution and defines the residence time of the liquid in the chip. The residence time can be estimated as volume of the chip divided by flow rate. For the volume of the chip in the current design of 2.5 nl and time resolution of 1 ms the consumption is 2.5 ul/s which decreases inversely proportionally to residence time, i.e. 0.25 ul/s for 10 ms. Thus, in the current setup in which pressure is applied over a time period of 1 s per each plunged grid, the maximal sample consumption is 2.5 µl per grid at 1 ms time resolution and 0.25 ul/grid at 10 ms time resolution. With several modifications the chip volume can be reduced by a factor of 8 reducing consumption volumes 8 times. Furthermore, decreasing time during which pressure is applied to the chip to ~100 ms, the consumption can be further reduced by a factor of 10 resulting in volumes of tens nl or few nl per grid.

The plunging time $t_{plunge}$ control is achieved using three different arm movement regimes (FIG. 5).

In all movement regimes, the grid is first approached towards the nozzle with a low speed (left part of the solid line in the graph of FIG. 5) and once reached the nozzle, accelerated following a chosen regime. In this way, the speed of the grid $V_{grid}$ is low during droplet application on the grid allowing to maximize the number of applied droplets and consequently maximizes the usable cryo-EM areas on the grid as follows from formula (2).

The three plunger time regimes distinguished herein are:

1) Fast regime (reaction delay time <10 ms; Table 1): this trajectory regime (solid line FIG. 5) allows maximum number of droplets per grid (N) while allowing for fast plunging times, and requires the following conditions:
   - In both fast and intermediate plunging regime, pressure is applied to the solutions in the channels of microfluidic chip and the laser shutter is opened a certain time prior to plunging is initiated as to stabilize the flow and droplet generation in the microfluidic chip (this time is around 1 s in the exemplified setup, but may as well be lower). After completion of plunging, the pressure is dropped to 0 and the shutter is closed immediately.
   - A pressure of a few hundred millibar is applied to the microfluidics chip such that the generated flow rate results in a residence time ($t_{chip}$) that is around half of desired reaction delay time and may be down to or lower than 1 ms.
   - The laser operates at repetition frequency of at least 5 kHz (5 pulses per ms).
   - The plunger arm is moved slowly towards the nozzle and as the lower edge of the grid reaches nozzle level, the arm is rapidly accelerated by applying a voltage above 5, preferably above 12, and below 200 V to the voice coil and decelerated by applying reverse voltage of the same amplitude once the grid is submerged in liquid ethane until the lowest arm position is reached or the arm is stopped. The plunging time $t_{plunger}$ in this regime is below 10 ms.
2) Intermediate regime (reaction delay time: ~10-~50 ms; see Table 1): as for the fast delay time regime, this trajectory regime (dashed line FIG. 5) can be achieved by continuous unidirectional movement of the plunger arm. Conditions are as follows:
   - Pressure applied to microfluidic chip is adjusted to have the generated flow rate resulting in residence time ($t_{chip}$) around half of the total delay time $t_d$.
   - The laser frequency between 1 and 5 kHz can be used depending on possible sample consumption and required coverage of the grid with microdroplets.
   - The arm is moved slowly towards the nozzle and as lower edge of the grid reaches nozzle level, rapidly accelerated by applying appropriate voltage that results in arm acceleration such that the plunging time $t_{plunger}$ is around half of the desired delay time. This is achieved by applying pulse width modulated (PWM) signal to the arm with maximum voltage of 5V resulting in average applied voltage of below 5 V.
   - If the speed of the arm is below 1 m/s when arm is close to ethane surface, then the arm is further accelerated prior to entering the cryogenic container, to reach the entrance speed of at least 1 m/s and to ensure efficient vitrification of protein solution.
3) Slow regime (reaction delay time >50 ms; see Table 1): this trajectory regime (dotted line FIG. 5) allows for longer delay times by reversing the arm direction after depositing sample from the nozzle.
   - Pressure applied to microfluidic chip is adjusted to achieve flow rate resulting in residence time ($t_{chip}$) of around 30 ms such that both stable droplet formation and spray generation can be achieved.
   - The laser frequency may be reduced to ~1 kHz.
   - The arm is moved slowly towards the nozzle and once the upper edge of the grid reaches nozzle level its direction is reversed. It passes second time in front of the nozzle and returns to park position.
   - The plunger arm is parked for defined delay time under high humidity conditions to prevent excessive droplet evaporation.
   - Once grid passes second time in front of the nozzle, the laser shutter is closed and liquid vessels are depressurized to stop jetting/ejecting droplets.
   - After a defined delay time the grid is plunged within a few ms by applying constant acceleration until it reaches ethane surface after which it is decelerated as in the other plunging regimes.

TABLE 1

Regimes of mixing and plunger arm activation

| Reaction delay time regime | Plunger arm Regime | Plunger time $t_{plunge}$ (ms) | Mixing time $t_{chip}$ (ms) | Applied voltage (V) | Plunger arm direction reversed |
|---|---|---|---|---|---|
| Short (~1-1° ms) | Fast | 1-1° ms | 1-5 ms | >5 V | No |
| Medium (~11-5° ms) | Intermediate | 11-5° ms | 5-2° ms | 5 V | No |
| Long (>5° ms) | Slow | >5° ms | ~3° ms | 5 V | Yes |

Method for Sample Preparation for Time-Resolved Analysis

Another main aspect of the invention relates to a method for protein sample preparation for time-resolved analysis, preferably Cryo-EM analysis, comprising the steps of:

a. combining two or more aqueous solutions and an oil composition in a microfluidic chip, wherein said chip is configured for forming oil-encapsulated droplets of the aqueous solutions, b. mixing said aqueous solutions within said oil-encapsulated droplets in the chip, c. extracting the oil composition for merging the droplets of mixed aqueous solution in said chip, d. generating spray of microdroplets from the mixed aqueous solutions for spraying, e. depositing said droplets on a grid, wherein the microfluidic chip comprises at least one outlet opening configured for droplet spraying. Moreover, in a specific embodiment, said method further comprises the step of:

f. plunge-freezing the grid comprising the sprayed droplets in cryogen, wherein said grid is held by a plunger arm.

Said method as described herein may use some or all of the devices described herein, and may further include any one or more of the following steps:

placing a grid in the grid-clip mechanism (6) of the plunger arm, and apply at least 2 aqueous solutions to at least 2 inlet channels (28) and an oil composition to at least 1 inlet channel (29) of the chip (1) as described herein, and/or and wherein the oil composition comprises fluorinated oil and a surfactant in the range of 1-10% (w/v), and/or setting the pressure control using the microprocessor-based control unit (42) for mixing the solutions at a constant flow rate and subsequent droplet generation in the chip, by selecting a pressure ratio for the oil/aqueous phases in the inlet channels below 1 bar, and/or synchronizing the activity of the actuation module for droplet generation and the pressure controller using the microprocessor-based controller unit (42) and optionally programmed on a computer (PC), and activating the plunger arm regime of the plunger module for a specified reaction delay time, to allow rapid plunge freezing of the grid in the cryogen after the droplets are sprayed on the grid, wherein the specified reaction delay time is defined as in formula:

$$t_d = t_{chip} + t_{fly} + t_{plunger}$$

wherein $t_{chip}$ depends on the pressure setting, $t_{fly}$ depends on the droplet actuation setting, and $t_{plunger}$ depends on the plunger arm movement setting, and/or wherein the minimal speed of the plunger arm to hit the cryogen is 1 m/s, and/or after the droplet has been deposited on the grid and the plunger arm has completed its movement to position the grid in the cryogen, releasing the pressure from the inlets to stop the flow, Furthermore, the method described above may further involve deactivating the actuation module, and holding the plunger arm in the desired position (preferably in the cryogen liquid).

In a specific embodiment, the pressure is set <1 bar and the ratio of pressures between the oil composition and the aqueous solution set to a value between 0.5-1.5. In a further specific embodiment, the pressure setting is less than 150 mbar in the oil composition and maximum 100 mbar in the aqueous solutions to obtain a constant flow rate of 2-20 μl/min, within a 'flow stabilization time' (which is the time prior to the reaction delay time) in less than 1 s, preferably in less than 100 ms, even more preferably in less than 1 ms.

Generation of stable droplets encapsulating aqueous solutes being mixed in the mixer (FIG. 3A) requires a precise oil composition in the inlet channel (29). Representative oils useful as a carrier liquid include carbon-based oils, silicone-based oils, and fluorinated oils. Representative examples of oils useful in the invention include embryo-tested mineral oil, light mineral oil, heavy mineral oil, PCR mineral oil, AS4 silicone oil, AS 100 silicone oil, AR205 silicone oil, AR 200 silicone oil, AR 1000 silicone oil, AP 100 silicone oil, AP 1000 silicone oil, AP 150 silicone oil, AP 200 silicone oil, CR 200 Silicone oil, DC 200 silicone oil, DC702 silicone oil, DC 710 silicone oil, octanol, decanol, acetophenone, perfluoro-oils perfluorononane, perfluorodecane, perfluorodimethylcylcohexane, perfluoro-1-butanesulfonyl fluoride, perfluoro-101-octanesulfonyl fluoride, perfluoro-1-octanesulfonyl fluoride, nonafluoro-1-butanesulfonyl chloride, nonafluoro-tert-butyl alcohol, perfluorodecanol, perfluorohexane, perfluorooctanol, perfluorodecene, perfluorohexene, perfluorooctene, fuel oil, halocarbon oil 28, halocarbon oil 700, hydrocarbon oil, glycerol, 3M Fluoriner fluids, any plant-based or vegetal oils, nut-based oils, or oil from herbs or spices.

Fluorinated oil is suitable as the main component of the continuous (oil) phase when using protein solutions and used herein. Fluorinated phases are known to be inert and do not mix with either aqueous or hydrogenated hydrophobic/amphipathic solution rendering it suitable for working with both soluble and membrane proteins (Gruner et al., 2015). Fluorinated oil NOVEC 7500 was chosen as the main component of the continuous phase, as it also has a low viscosity, ~1.25 mPa*s at 20° C. (3M Novec 7500 datasheet, kinematic viscosity 0.77 cSt, density 1614 kg/m3) which makes it suitable for microfluidic devices with tiny (micro) channels. Stable droplet formation in a PDMS-made microchannel using a fluorinated oil requires chemical functionalization of the inner channel walls by a surfactant (Franke et al., 2009). Though, this may also be required for microchannels with separate droplets in oil phase composed of other material as well. This is achieved by using for instance the additive PFO (1H,1H,2H,2H-Perfluoro-1-octanol, Sigma-Aldrich) in the fluorinated oil composition at a concentration of 1-1% (w/v), preferably at a concentration of 5% (w/v). In a further specific embodiment the method as described herein has an oil composition comprising fluorinated oil and a 10% (w/v) surfactant, and/or preferably the fluorinated oil is PFO (Perfluoro-1-octanol)).

Another specific embodiment relates to said method as described herein wherein the actuation is obtained via laser-induced cavitation, preferably by using the integrated apparatus comprising the droplet actuation module as described herein, the method comprising the steps of the method described above, and thus specifically comprising the step of:

a. placing a grid in the grid-clip mechanism (6) of the plunger arm of the integrated apparatus as described herein, and apply at least 2 aqueous solutions to at least 2 inlet channels (28) and an oil composition to at least 1 inlet channel (29) of the chip (1) or the apparatus as described herein, b. switching on the laser, setting the pressure control using the microprocessor-based control unit of the integrated apparatus for mixing of the solutions and subsequent droplet generation in the chip at a constant flow rate, by selecting a pressure ratio for the oil/aqueous phases in the inlet channels below 1 bar, and a. synchronizing the pressure control with the opening of the laser aperture (or shutter) using the microprocessor-based controller unit (42), as to focus the laser and induce cavitation on the chip for forming droplets, and activating the plunger arm of the plunger module after a specified reaction delay time, preferably within less than 10 ms, to allow rapid plunge freezing of the grid in the cryogen after the droplets are sprayed on the grid, c. after the droplets are deposited on the grid and plunger reaches the cryogen, stop the plunger arm movement, and close the laser aperture, wherein the specified reaction delay time is in in the range of around 1 ms to a few seconds, wherein the oil composition comprises fluorinated oil and a surfactant in the range of 1-10% (w/v), and wherein the pressure is set to a value <1 bar with the ratio between the oil and aqueous solution being in a range 0.5-1.5, and wherein at least 1 of the aqueous solutions applied in the inlet channels of step a. contains absorbing material at the emission wavelength of the laser.

In the specific embodiment where laser-induced cavitation is applied as actuating module for the DOD generation, the cavitation is only generated upon absorption of laser energy, which requires the presence of a material absorbing light at the wavelength of the laser (e.g. 532 nm) within the aqueous mixture. In a specific embodiment as exemplified herein, amaranth dye (Sigma CAS Number 915-67-3) was added to one of the aqueous solutions being mixed at a concentration of 12 mM (corresponding OD at 532 nm of ca. 300 OD units), which corresponds to the optimum concentration (after mixing to a final concentration of about 6 mM) for this dye to be present in the nozzle for the required laser energy absorption (taking into account to have a minimal probability of chip damage), while being compatible with high protein contrast in cryo-EM.

The emission wavelength of the laser should correspond to the excitation wavelength of the absorbing material that is applied in the aqueous solution in the inlet channel. For instance, said laser may have an excitation wavelength of 532 nm and absorbing material absorbing at 532 nm, such as Amaranth Acid red 27 (CAS Number 915-67-3; extinction coefficient at 532 nm of 25000 M−1 cm-1), preferably present in a concentration in a range of 8-20 mM, more preferably at 1-15 mM, specifically at 12 mM in the solution prior to mixing, with a final concentration in the nozzle being optimal at 3-10 mM, 5-8 mM, preferably 6 mM; or alternatively Direct Red 81 (extinction coefficient at 532 nm of 15000 M−1 cm-1).

In another specific embodiment, said method described herein using laser-induced cavitation means for droplet generation applies a pulsed laser that is operating with pulse duration of 6 ns and a frequency of 2500 Hz for forming droplets of 7-15 pL.

The method as described herein may desire to apply a short reaction delay time, which may be obtained by applying a pressure of 22 mbar to the oil composition and to the aqueous solution, using a laser with frequency of 5000 Hz (at 5 pulses/ms) and a plunger arm transferring the grid between nozzle and cryogen solution in less than 8 ms preferably less than 1 ms. Alternatively, a sampled grid may be obtained using a method wherein a mid-term delay reaction time is selected by continuous unidirectional movement of the plunger arm but at lower speed; using a laser with frequency of 5000 Hz. Furthermore, the time resolved sampling method wherein a long reaction delay time is attained is obtained by reversing the direction of the arm movement and plunging the EM grid after user-specified delay.

Finally, the invention relates to the use of the microfluidic chip as described herein, and/or the plunger module as described herein, and/or the integrated apparatus as described herein, and or the methods as described herein, for time-resolved sample preparation, preferably sample preparation for Cryo-EM analysis, most preferably for time-resolved structural analysis.

It is to be understood that although particular embodiments, specific configurations as well as materials and/or molecules, have been discussed herein for methods, and products according to the disclosure, various changes or modifications in form and detail may be made without departing from the scope of this invention. The following examples are provided to better illustrate particular embodiments, and they should not be considered limiting the application. The application is limited only by the claims.

Examples

The examples presented herein provide for non-limiting proof of concept for a functional integrated apparatus and corresponding method for time-resolved sample preparation, and further supports the controllable working range for sample preparation for different applications of time-resolved sample preparations, such as specifically demonstrated herein for Cryo-EM sampling.

Example 1. Proof of Functionality of the Microfluidic Chip for Fast Mixing of Solutes with Optimal Efficiency To assess the efficiency and speed of the formation of the aqueous droplets in oil inside the microchannel (30) and mixing of aqueous droplets in the serpentine microchannel (31) of the mixing module (FIG. 3A) of the chip (1), a prototype chip with microchannels with a width of 50 μm and a height of 40-50 μm were fabricated. In this prototype, the serpentine channel arms (32) have a length of 150 μm each and a total number of 15 turns or bending regions (33), as demonstrated in FIG. 6. Measurements were performed for different pressure settings applied to the water and oil phase. FIG. 6 shows images of the chip device mixing module operating at a pressure applied to the oil and water phase of (FIG. 6A) 80, 85 mbar, (FIG. 6B) 120,115 mbar, and (FIG. 6C) 160, 140 mbar, respectively. The mixing efficiency was assessed optically upon mixing water with water containing a red dye. The degree of mixing between the aqueous liquids was estimated after each bending region of the channel (positions numbered in FIG. 6A as 1-8), by evaluating the distribution of the pixel intensity inside the droplets at sequential positions within the serpentine turns. At the beginning of the mixing process, histogram of pixel intensity clearly shows the presence of two distinct populations, a peak at lower intensity corresponding to the dye solution and one at higher intensity corresponding to the water. When a droplet advances along the serpentine, the distribution of pixel intensities become more uniform (see histogram FIG. 7). It was observed that the variation of the pixel intensity distribution inside the droplets did not significantly change further after turn number 2 indicating that at this point of the channel, the mixing inside the droplet is completed. Based on these results, we concluded that including only three turns in the serpentine is sufficient for fast efficient mixing for time-resolved cryo-EM sample preparation, allowing in this way to achieve a good mixing and minimize at the same time the serpentine arm/channel length and therefore the residence time of the droplet within the chip. The statistical analysis performed on the pixel intensity distribution inside the droplets showed that in a mixing module with 3 arms (as shown in FIG. 8) two aqueous solutions are mixed with an efficiency of at least 50%. This result is obtained by comparing the pixels intensity distribution for a droplet just at initiation of mixing versus its intensity distribution at the nozzle region (38), in the droplet generation module of the chip. The coefficient of variation cv gets reduced in a range of 50-80% (depending on the oil/water pressure), demonstrating that the mixing efficiency is at least 50% using this setup.

Example 2. Generation of Droplets-On-Demand (DOD) in the Droplet Generation Module Using Laser-Induced Cavitation The capability of the microfluidic chip to induce droplet ejection through actuation via laser-induced cavitation was tested using a microfluidic chip with a single straight channel, instead of the mixing and droplet merging module as described for the chip herein (with a serpentine channel for mixing and pillar-induced droplet merging for extraction).

The aqueous solution mixture arriving at the nozzle requires at least one absorber for the laser's emission wavelength, wherein the absorber, here being a dye, has a concentration optimized such that it is as low as possible on the one hand but is high enough to induce cavitation and droplet ejection at the laser energy/pulse low enough such that it does not damage the chip material, on the other. In this specific setup, the laser frequency was set to 2500 Hz (NdYAG laser, 532 nm, pulse duration 6 ns), and the energy per pulse adjusted to around 7.5 μJ of the focused beam at the nozzle region (38). Further, the experiment was repeated with an absorber's dye solution containing the protein GroEL (Protein Data Bank accession number 1SS8).

At first, the droplets from the sample mixture in the chip were ejected and sprayed on an EM grid. After passing through the spray, each grid was released from the plunger arm and protein stained using negative stain, to visualize the proteins on a transmission electron microscope. The imaging revealed protein particles with well-defined shape and ultrastructure expected for GroEL particles, suggesting that the protein structure was intact (FIG. 9).

Next, the chip-spray prototype was tested in combination with the plunger arm module. Several setups and repetitions confirmed that the setup of this system and the method used for preparation of grids with protein samples for single particle cryo-EM was robust and repeatable. Sprayed droplets were clearly visible on each grid, and the spreading of the liquid droplets was obtained as such that multiple areas of the grid had solute with an ice thickness thin enough to observe protein particles with high contrast (FIG. 10). As for the negative stain experiment, the proteins' structure was clearly visible, demonstrating that the overall process does not damage the biological sample. In conclusion, the plunger arm in combination with our DOD actuation module on a microfluidics chip has been demonstrated to allow fast and efficient sampling of proteins retaining their structural integrity, and suitable for Cryo-EM structural analysis.

Example 3. High-Resolution 3D Reconstruction from the Cryo-EM Sampling Method and Plunger Control Optimization The setup for time-resolved sampling containing a microfluidic chip with just a single channel, without mixing or droplet generation module, was used to plunge and freeze cryo-EM grids from which single particle images were collected on a JEOL cryoARM300 microscope. A total of about 700 high-quality micrographs were collected from 6 EM grids from which about 18000 particles have been selected and single particle reconstruction was applied to obtain a density map at a resolution of 3.8 Å (FIG. 11).

FIG. 12 indicates experimentally measured trajectories of the plunger arm containing a clipped EM grid for fast, medium and slow activation regimes, so with a reaction delay time regimes being short (range of 1-15 ms), medium (range of 20-35 ms) or long (170-225 ms). Movies were recorded using a high-speed camera with a framerate of 3000 fps to visualize the plunging trajectories over time (not shown). The vertical position of the EM grid present in the grid clip of the plunger arm, is shown in FIG. 12 as a function of time from the moment that plunger arm activity was initiated for the three regimes: short, medium, and long delay reaction time regime with corresponding periods of 10, 24 and 200 ms. The plunging times, the times between sample deposition on EM grid and freezing ($=t_{plunge}$), determined from the experimental trajectories are 9.0, 27.3 and 178 and 188 ms, respectively (in the long delay time regime, the grid passes twice in front of the nozzle tip). This example confirms the feasibility of the plunger arm control according to the proposed algorithm for each reaction delay time regime.

Example 4. Time-Resolved Preparation of Cryo-EM Samples Using Two Protein Solutions The fully assembled integrated apparatus, comprising the microfluidic chip containing mixer and DOD generator in combination with the plunger arm module, as well as the pressure control module, droplet actuation module, microprocessor-based control unit, and cryogen module, was tested for sample preparation (see FIG. 13). The correct and fast operation of the mixer was demonstrated by mixing two different protein solutions. The first solution contained apoferritin and the Amaranth Acid red 27 dye at concentration of 12 mM, whilst the second solution contained β-galactosidase. The camera of the optical module was used for videos recording during the operation and specifically the plunging in order to visualize the synchronized action of the microfluidic chip and spray generation with the plunge arm movement. A pressure of 50 mbar was applied to oil and water phases (protein samples) inlet channels, and the laser frequency was set to 2500 Hz. The plunged cryo-grids (Quanti-foil R 1.2-1.3) were screened using a JEOL JEM-1440 TEM microscope. The results showed that both proteins were detected in the same area of the frozen samples (see FIG. 14), thereby providing proof of concept and function of the complete integrated set-up. The time resolution of this experiment was below 5 ms with a mixing time of around 20-30 ms ($t_{chip}$) and plunging time ($t_{plunge}$) around 20 ms.

For a more detailed analysis, cryo-grids (Quanti foil R 2/1 coated with 3 nm continuous carbon film) were plunged using the microfluidics mixer and plunger device and single particle images were collected on a JEOL cryoARM300 microscope. A total of about 15000 particles were selected from 720 high-quality micrographs collected from two EM grids. After classification, 6000 particles were selected for β-galactosidase and 7000 for Apoferritin and used for single particle reconstruction. The reconstructions at resolution of 3.3 Å and 2.7 Å were obtained for β-galactosidase and Apoferritin, respectively (FIG. 15).

Finally, to demonstrate the integrated device in use with multiple nozzles, a diffractive beam splitter (e.g. HOLO/OR Ltd., position in integrated device indicated in FIG. 1-44) was introduced into the laser path. This optional optical element splits a single laser beam into a defined number of beams of equal intensity propagating at defined equispaced angles. This results in a linear array of equally spaced diffraction spots in the focal plane of the objective lens. The optical element that generates a 1-dimensional beam array (1×N) is suitable for parallel droplet generation. The setup was tested with microfluidics chip containing 2 or 3 nozzles (as shown in FIGS. 3 and 16). Thus, for every laser pulse two to three microjets of droplets were generated increasing usable surface on the grid for data collection.

Example 5. Pulsed Injection for Reduced Sample Consumption

Control of the liquid flow in the chip is obtained by using a custom software interface written using LabView to fine-tune the device in its use for low sample amounts by controlling the liquid flow in the chip as to only induce flow temporarily and specifically during plunging time. The software interface control further allowed to synchronizes exposure of the chip nozzle to the laser pulses through control of the pressure module. The interface allows to set the desired pressure both for the plunging and standby mode. The integrated device exemplified herein is controlled through the software interface to regulate the following parameters:

Laser frequency and intensity: these values influence the number of droplets to be ejected on the grid and their size distribution.

The plunging time: the time between the moment the sample is applied on the grid (grid passes in front of the nozzle) and the moment it is plunged in liquid ethane.

Pressure applied to the sample and oil channels during plunging: the pressure applied to the channel is set to have liquid flowing only during actual plunging (plunging mode); when other operations are performed, the pressure applied to the proteins channel is set to a value for which no sample is consumed, so that no water in oil droplets are formed (stand-by mode).

The device as exemplified herein thus has the possibility to control the sample flowing into the microfluidics chip in a way that the sample is consumed only during actual plunging. The typical operating flow rate is in a range 1-4 μL/min. The software-controlled transient application of pressure module and laser beam enables to induce the flow and spray only during plunging while maintaining the setup in standby mode in between plunging events by reducing the applied pressure to minimize sample flow in standby regime. A certain priming of the device is needed to stabilize the flow and droplet formation which results in application of high pressure over a period of approximately 500 ms and corresponding sample consumption of below 100 nl per plunging.

REFERENCES

Ashtiani, D., Venugopal, H., Belousoff, M., Spicer, B., Mak, J., Neild, A., de Marco, A., 2018. Delivery of femtolitre droplets using surface acoustic wave based atomisation for cryo-EM grid preparation. Journal of Structural Biology 1-26. doi:10.1016/j.jsb.2018.03.012

Berriman, J., Unwin, N., 1994. Analysis of transient structures by cryo-microscopy combined with rapid mixing of spray droplets. Ultramicroscopy 56, 241-252.

Bringer, M. R., Gerdts, C. J., Song, H., Tice, J. D., Ismagilov, R. F., 2004. Microfluidic systems for chemical kinetics that rely on chaotic mixing in droplets 362, 1087-1104. doi:10.1098/rsta.2003.1364

Chen, B., Frank, J., 2015. Two promising future developments of cryo-EM: capturing short-lived states and mapping a continuum of states of a macromolecule. Microscopy (Oxf) dfv344-11. doi:10.1093/jmicro/dfv344

Chen, B., Kaledhonkar, S., Sun, M., Shen, B., Lu, Z., Barnard, D., Lu, T.-M., Gonzalez, R. L., Jr., Frank, J., 2015. Structural Dynamics of Ribosome Subunit Association Studied by Mixing-Spraying Time-Resolved Cryogenic Electron Microscopy. Structure/Folding and Design 23, 1097-1105. doi:10.1016/j.str.2015.04.007.

Dandey V. P., Budell, W. C., Wei, H., Bobe, D., Maruthi, K., Kopylov, M., et al. (2020). Time-resolved cryo-EM using Spotiton. Nature Methods, 200, 1-12. doi.org/10.1038/s41592-020-0925-6)

Delrot, P., Modestino, M. A., Gallaire, F., Psaltis, D., Moser, C., 2016. Inkjet Printing of Viscous Monodisperse Microdroplets by Laser-Induced Flow Focusing. Phys. Rev. Applied 6, 024003. doi:10.1103/PhysRevApplied.6.024003

Dijkink, R., Ohl, C.-D., 2008. Laser-induced cavitation based micropump. Lab Chip 8, 1676-6. doi:10.1039/b806912c Dubochet, J., Adrian, M., Chang, J.-J., Homo, J. C., Lepault, J., McDowall, A. W., Schultz, P., 1988. Cryo-electron microscopy of vitrified specimens. Quart. Rev. Biophys. 21, 129-228.

Feng, X., Fu, Z., Kaledhonkar, S., Jia, Y., Shah, B., Jin, A., Liu, Z., Sun, M., Chen, B., Grassucci, R. A., Ren, Y., Jiang, H., Frank, J., Lin, Q., 2017. A Fast and Effective Microfluidic Spraying-Plunging Method for High-Resolution Single-Particle Cryo-EM. Structure/Folding and Design 1-12. doi:10.1016/j.str.2017.02.005

Frank, J., 2017. Time-resolved Cryo-Electron Microscopy: Recent Progress. Journal of Structural Biology 1-10. doi:10.1016/j.jsb.2017.06.005

Franke, T., Abate, A. R., Weitz, D. A., Wixforth, A., 2009. Surface acoustic wave (SAW) directed droplet flow in microfluidics for PDMS devices. Lab Chip 9, 2625-2627. doi:10.1039/b906819h Gruner, P., Riechers, B., Orellana, L. A. C., Brosseau, Q., Maes, F., Beneyton, T., Pekin, D., Baret, J.-C., 2015. Stabilisers for water-in-fluorinated-oil dispersions: Key properties for microfluidic applications. Current Opinion in Colloid & Interface Science 20, 183-191. doi:10.1016/j.cocis.2015.07.005

Haliburton, J. R., Kim, S. C., Clark, I. C., Sperling, R. A., Weitz, D. A., Abate, A. R., 2017. Efficient extraction of oil from droplet microfluidic emulsions. Biomicrofluidics 11, 034111. doi:10.1063/1.4984035

Jain, T., Sheehan, P., Crum, J., Carragher, B., Potter, C. S., 2012. Spotiton: A prototype for an integrated inkjet dispense and vitrification system for cryo-TEM. Journal of Structural Biology 179, 68-75. doi:10.1016/j.jsb.2012.04.020

Knoška, J., Adriano, L., Awel, S., Beyerlein, K. R., Yefanov, O., Oberthuer, D., Murillo, G. E. P., Roth, N., Sarrou, I., Villanueva-Perez, P., Wiedorn, M. O., Wilde, F., Bajt, S., Chapman, H. N., Heymann, M., 2020. Ultracompact 3D microfluidics for time-resolved structural biology. Nature Communications 11, 1-12. doi:10.1038/s41467-020-14434-6

Kontziampasis, D., Klebl, D. P., Iadanza, M. G., Scarff, C. A., Kopf, F., Sobott, F., Monteiro, D. C. F., Trebbin, M., Muench, S. P., White, H. D., 2019. A cryo-EM grid preparation device for time-resolved structural studies. IUCrJ 6, 1024-1031. doi:10.1107/S2052252519011345

Lu, Z., Barnard, D., Shaikh, T. R., Meng, X., Mannella, C. A., Yassin, A. S., Agrawal, R. K., Wagenknecht, T., Lu, T.-M., 2014. Gas-assisted annular microsprayer for sample preparation for time-resolved cryo-electron microscopy. J. Micromech. Microeng. 24, 115001. doi:10.1088/0960-1317/24/11/115001

Niu, X., Gulati, S., Edel, J. B., deMello, A. J., 2008. Pillar-induced droplet merging in microfluidic circuits. Lab Chip 8, 1837-1841. doi:10.1039/B813325E
Park, S.-Y., Wu, T.-H., Chen, Y., Teitell, M. A., Chiou, P.-Y., 2011. High-speed droplet generation on demand driven by pulse laser-induced cavitation. Lab Chip 11, 1010-3. doi:10.1039/c0lc00555j
Patrascioiu, A., Fernández-Pradas, J. M., Palla-Papavlu, A., Morenza, J. L., Serra, P., 2014. Laser-generated liquid microjets: correlation between bubble dynamics and liquid ejection. Microfluid Nanofluid 16, 55-63. doi: 10.1007/s10404-013-1218-5
Qian, J. Y., Li, X. J., Gao, Z. X., Jin, Z. J., 2019. Mixing efficiency and pressure drop analysis of liquid-liquid two phases flow in serpentine microchannels. Journal of Flow Chemistry 9, 187-197. doi:10.1007/s41981-019-00040-1
Rubinstein, J. L., Guo, H., Ripstein, Z. A., Haydaroglu, A., Au, A., Yip, C. M., Di Trani, J. M., Benlekbir, S., Kwok, T., 2019. Shake-it-off: a simple ultrasonic cryo-EM specimen-preparation device. Acta Crystallogr D Struct Biol 75, 1063-1070. doi:10.1107/S2059798319014372
Tagawa, Y., Oudalov, N., Visser, C. W., Peters, I. R., van der Meer, D., Sun, C., Prosperetti, A., Lohse, D., 2012. Highly Focused Supersonic Microjets. Phys. Rev. X 2, 031002-10. doi:10.1103/PhysRevX.2.031002
Teh, S.-Y., Lin, R., Hung, L.-H., Lee, A. P., 2008. Droplet microfluidics. Lab Chip 8, 198-220. doi:10.1039/b715524g
Tran, T. M., Lan, F., Thompson, C. S., Abate, A. R., 2013. From tubes to drops: droplet-based microfluidics for ultrahigh-throughput biology. J. Phys. D: Appl. Phys. 46, 114004-18. doi:10.1088/0022-3727/46/11/114004
Tung, K. Y., Li, C. C., Yang, J. T., 2009. Mixing and hydrodynamic analysis of a droplet in a planar serpentine micromixer. Microfluid Nanofluid 7, 545-557. doi: 10.1007/s10404-009-0415-8.
Mäeots, Lee, Nans, Jeong, Esfahani, Smith, Lee, Lee, Peter, Enchev, 2020. Modular microfluidics enables kinetic insight from time-resolved cryo-EM. Nature communications 11:3465. doi.org/10.1038/s41467-020-17230-4
Wang, J., Wang, J., Feng, L., Lin, T., 2015. Fluid mixing in droplet-based microfluidics with a serpentine microchannel. RSC Advances 5, 104138-104144. doi:10.1039/C5RA21181F
Xu, B., Nguyen, N.-T., Neng Wong, T., 2011. Droplet Coalescence in Microfluidic Systems. MNS 3, 131-136. doi:10.2174/1876402911103020131
Zwaan, E., Le Gac, S., Tsuji, K., Ohl, C.-D., 2007. Controlled Cavitation in Microfluidic Systems. Phys. Rev. Lett. 98, 254501. doi:10.1103/PhysRevLett.98.254501

The invention claimed is:

1. A method for time-resolved preparation of a sample on a grid, comprising the steps of:

a. combining two or more aqueous solutions and an oil composition in a microfluidic chip, so as to form oil-encapsulated droplets of the two or more aqueous solutions in the microfluidic chip,
b. mixing the two or more aqueous solutions within the oil-encapsulated droplets in the microfluidic chip,
c. extracting the oil composition to merge the oil-encapsulated droplets so as to generate a mixed aqueous solution in the microfluidic chip,
d. generating droplets from the mixed aqueous solution for spraying, and
e. depositing the droplets of the mixed aqueous solution on a grid, wherein the microfluidic chip comprises at least one outlet opening configured for droplet spraying.

2. The method according to claim 1, further comprising the step of:

f. plunge-freezing the grid comprising the sprayed droplets, wherein the grid is held by a plunger arm.

3. The method according to claim 1, wherein the flow rate in the microfluidic chip is controlled via a pressure control module, and wherein the oil composition is extracted in step c through pillar-induced droplet merging.

4. The method according to claim 1, wherein the aqueous solutions in the oil-encapsulated droplets are mixed in step b by flowing through a serpentine microchannel comprising at least 3 arms.

5. The method according to claim 1, wherein the generation of droplets in step d is obtained using a droplet-on-demand actuation module.

6. The method according to claim 2, wherein the plunger arm is activated through an arm controller unit corresponding to a selected reaction delay time ($t_d$), as defined by the formula:

$$td=t_{chip}+t_{fly}+t_{plunger},$$

wherein $t_{chip}$ depends on the flow rate in the microfluidic chip, $t_{fly}$ depends on the droplet generation setting, and $t_{plunger}$ depends on the plunger arm movement setting by the controller unit.

7. The method according to claim 2, wherein the speed of the plunger arm is higher than 1 m/s at the surface of the cryogen.

8. The method according to claim 1, wherein the oil composition comprises a fluorinated oil and a surfactant in the range of 1-10% (w/v).

9. The method according to claim 3, wherein the pressure is set to a value <1 bar for the oil composition, and a pressure ratio of the oil/aqueous phase in a range of 0.5-1.5.

10. The method according to claim 1, wherein the microfluidic chip is a microfluidic chip for mixing solutes comprising:

a. a mixer module (a) comprising:
   i. at least 3 inlet channels, wherein each channel ends in the same microchannel for combining the solutes of the inlet channels,
   ii. the microchannel being fluidly connected to a serpentine microchannel comprising at least 3 arms, and
b. a droplet merging module (b) comprising:
   i. a main microchannel fluidly connected via one end with the serpentine microchannel of the mixer module (a),
   ii. at least one side channel, as oil outlet from the main microchannel, wherein the side channel is transversely intersecting the main microchannel, and comprises an array of pillars, wherein the pillars each comprise a flat surface that is substantially in line with the wall of the main microchannel, each separated from each other at a distance (dl), which is smaller than the droplet diameter, or is at least 2 times smaller than the width of the main microchannel (d2), and wherein the array of pillars is at a distance (d2) of the opposite wall of the main microchannel, wherein d2 is substantially the same as the width of the main microchannel, and the pillars extend inside the side channel;

wherein each of the inlet channels of the mixer module (a) are further connectable to a pressure control module configured to control at least the pressure in the inlet channels.

11. The method according to claim 10, the microfluidic chip further comprising:

c. a droplet generation module (c) comprising:

at least one nozzle comprising a chamber, fluidly connected on one end to the main microchannel of the droplet merging module (b), and forming an outlet opening to the outside of the microfluidic chip for ejecting the droplets from the microfluidic chip on the other end.

12. The method according to claim 10, comprising utilizing an integrated apparatus for time-resolved preparation of a sample comprising:

i. the microfluidic chip of claim 10, connected to a pressure control module for control of the flow rate in the channels of the microfluidic chip, ii. a droplet-on-demand actuation module for controlled ejection of droplets from the nozzle outlet opening from the microfluidic chip of component i, iii. the plunger module, wherein the plunger module comprises:

a. a plunger arm, which is rotatable around a horizontal axis, comprising i. a grid clip for holding a grid on one end of the plunger arm, ii. a rotational voice coil comprising an electrical coil and stationary permanent magnets on the other end of the plunger arm, and iii. an optical encoder comprising a rotatable code wheel and a detector, positioned at the rotation axis of the arm, and b. an arm controller unit, for controlling the movement of the arm via the current through the coil, wherein the plunger arm is mounted on a post at its rotation axis, for positioning the arm on a support structure, and the arm controller unit is electronically connected to the encoder and rotational voice coil, iv. a cryogenic module, and v. a microprocessor-based controller unit configured to synchronize and control the movement of the plunger arm via the arm controller unit, the pressure control module, and the thermostatic cryogenic module, and wherein the components i to iv are mounted on one or more support structures configured to allow plunge-freezing of a grid held by the plunger module after droplets generated by the microfluidic chip have been sprayed on the grid.

13. The method according to claim 10, wherein the microchannels have a rectangular-shaped cross-section with an aspect ratio below 2, and a maximum height of 80 μm±10 μm, preferably 50 μm±10 μm.

14. The method according to claim 11, wherein the droplet generation module (c) comprises at least two nozzles, wherein each chamber of the nozzles is fluidly connected on one end to the main microchannel of the droplet merging module (b) through a microchannel, and wherein each chamber ends in an outlet opening to the outside of the microfluidic chip, and/or wherein the chambers are rectangularly shaped.

15. The method according to 10, wherein the modules (a) to (c) are interconnectably composed of silicone elastomer, polydimethylsiloxane (PDMS), a thermoplastic polymer, or glass.

16. The method according to claim 10, wherein the microfluidic chip modules (a) to (c) are mounted on a flat surface material, an optically transparent flat surface material, a flat surface material of glass or quartz, a flat surface material comprising a miniaturized piezoelectric actuator, and/or a flat surface material having a thickness of 250 μm or less.

17. The method according to claim 16, wherein the outlet opening is formed by cutting off the microfluidic chip modules (a) to (c) and the surface material in the same plane.

18. The method according to claim 12, wherein the components i to iv are mounted on the support structure(s) as follows: the microfluidic chip is mounted on a XYZ stage which is on a holder positioned on a motorized XY stage, which also has the plunger module and cryogenic module mounted on it, and wherein the relative position of the plunger module to the microfluidic chip allows plunger arm movement parallel to the plane of the nozzle outlet opening of the microfluidic chip, and wherein the movement positions the grid clip when holding a grid with its grid surface parallel to the surface of the nozzle outlet(s) at a distance below 1 mm.

19. The method according to claim 12, wherein the droplet-on-demand actuation module iii comprises:

a pulsed laser connected to an automated aperture and a power meter, and, an optical module for focusing the laser on the nozzle of the microfluidic chip, wherein the pulsed laser is focused at a point in the nozzle at a distance in the range of 25-50 pm from the nozzle outlet opening.

20. The method according to claim 19, wherein the optical module comprises:

an objective lens for focusing the laser beam on the nozzle of the microfluidic chip, and optical elements selected from the group of elements comprising: a beam expander, a prism, mirrors, a beam splitter, a diffractive beam splitter, an optical microscope, and a camera, wherein said objective lens is mounted to be movable in the Z direction for focusing the laser on the nozzle of the chip.

21. The method for time-resolved preparation of a sample on a grid according to claim 3, wherein:

the grid is placed in a grid-clip of a plunger module, and at least 2 aqueous solutions are applied to at least 2 separate inlet channels and an oil composition to at least 1 third inlet channel of a microfluidic chip, and the pressure of the at least two aqueous solutions and the oil composition is controlled using a micro-processor based controller unit, for mixing the solutions at a constant flow rate, and/or for removing the oil phase through the side channels of the microfluidic chip, the droplet generation is synchronized by the pressure controller module using the microprocessor-based controller unit, and using an arm controller (11) of the plunger module to obtain a desired reaction delay time (ta), and after plunge-freezing the grid in a cryogen, the pressure is released using the pressure controller module.

22. The method for time-resolved preparation of a sample on a grid according to claim 3, wherein the pressure control module is set for obtaining a flow rate between 2-60 pl/min in the microfluidic chip, which allows optimal mixing conditions in chip in less than 100 ms, preferably in less than 10 ms, even more preferably in less than 1 ms.

23. The method for time-resolved preparation of a sample on a grid according to claim 1, wherein the oil composition comprises fluorinated oil and 10% (w/v) surfactant, or wherein the fluorinated oil is 1H,1H,2H,2H-Perfluoro-1-octanol.

24. The method for time-resolved preparation of a sample on a grid according to claim 1, wherein the droplet generation is obtained via laser-induced cavitation, the method further comprising the steps of:

switching on a laser, synchronizing the pressure with the opening of the laser shutter using a microprocessor-based controller unit, as to focus the laser on the microfluidic chip and induce cavitation for forming droplets, closing the laser shutter after droplet generation, wherein at least 1 of the aqueous solutions applied to the microfluidic chip contains absorbing material at the emission wavelength of the laser, and wherein the laser is focused in the microchannel of the microfluidic chip at a distance from the outlet opening allowing droplet spraying.

* * * * *